United States Patent
Smoot et al.

(10) Patent No.: US 9,041,642 B2
(45) Date of Patent: May 26, 2015

(54) LARGE AUDIENCE 3D DISPLAY SYSTEM WITHOUT GLASSES

(71) Applicant: DISNEY ENTERPRISES, INC., Burbank, CA (US)

(72) Inventors: Lanny Smoot, Thousand Oaks, CA (US); Quinn Smithwick, Pasadena, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 249 days.

(21) Appl. No.: 13/717,214

(22) Filed: Dec. 17, 2012

(65) Prior Publication Data

US 2014/0168051 A1    Jun. 19, 2014

(51) Int. Cl.
*G01J 5/08* (2006.01)
*G02B 27/22* (2006.01)
*H04N 13/04* (2006.01)

(52) U.S. Cl.
CPC .......... *G01J 5/0896* (2013.01); *H04N 13/0404* (2013.01); *H04N 13/0418* (2013.01); *H04N 13/047* (2013.01); *H04N 13/0497* (2013.01)

(58) Field of Classification Search
CPC .................................. G06F 3/01; G02B 27/22
USPC ................................................. 345/102, 158
See application file for complete search history.

(56) References Cited

U.S. PATENT DOCUMENTS

| | | | | |
|---|---|---|---|---|
| 4,571,041 | A * | 2/1986 | Gaudyn | 353/10 |
| 6,094,242 | A * | 7/2000 | Yamanaka | 349/13 |
| 6,304,303 | B1 * | 10/2001 | Yamanaka | 349/13 |
| 7,724,210 | B2 * | 5/2010 | Sprague et al. | 345/8 |
| 8,477,996 | B2 * | 7/2013 | Zschau | 382/103 |
| 2005/0146787 | A1 * | 7/2005 | Lukyanitsa | 359/462 |
| 2008/0043487 | A1 * | 2/2008 | Sprague | 362/581 |
| 2010/0171697 | A1 * | 7/2010 | Son et al. | 345/158 |
| 2012/0019529 | A1 * | 1/2012 | Kimpe | 345/419 |
| 2012/0182407 | A1 * | 7/2012 | Yoshida | 348/54 |
| 2012/0314145 | A1 * | 12/2012 | Robinson | 349/15 |
| 2013/0321406 | A1 * | 12/2013 | Harrold et al. | 345/419 |

FOREIGN PATENT DOCUMENTS

| | | |
|---|---|---|
| EP | 0696145 | 2/1996 |
| EP | 1245990 | 10/2002 |
| WO | 02080579 | 10/2002 |

OTHER PUBLICATIONS

EP Extended Search Report & Search Opinion from EP Application No. 13190384.1, Mar. 13, 2014.

\* cited by examiner

*Primary Examiner* — Allison Johnson
*Assistant Examiner* — Afroza Chowdhury
(74) *Attorney, Agent, or Firm* — Marsh Fischmann & Breyfogle LLP; Kent A. Lembke

(57) ABSTRACT

A three dimensional (3D) display apparatus for without 3D glasses. The display apparatus includes a display element operated to display left and right eye images. A back light assembly back lights the display element and includes light bars with a row of infrared (IR) light receivers that are each paired to a white light emitting diode (LED). Viewers in seats in tiered rows such that their heads are in known viewing locations. Left and right side illuminators illuminate the left and right sides of the faces of the viewers with IR light. The IR light is synchronized with display of the left and right eye images. IR reflected from viewers' faces pass through the display element and is focused onto IR light receivers, which causes LEDs to emit light onto the display element and provide left or right eye images to the viewers at their left or right eyes.

22 Claims, 23 Drawing Sheets

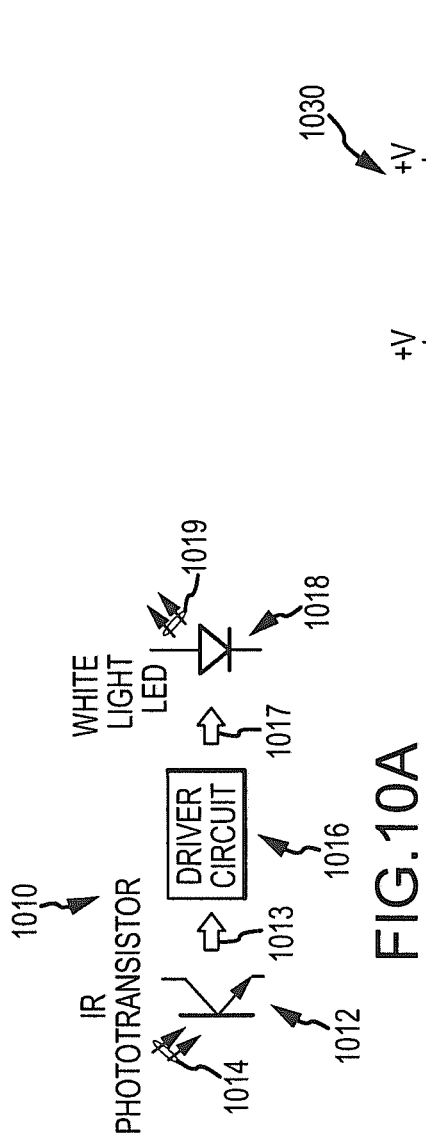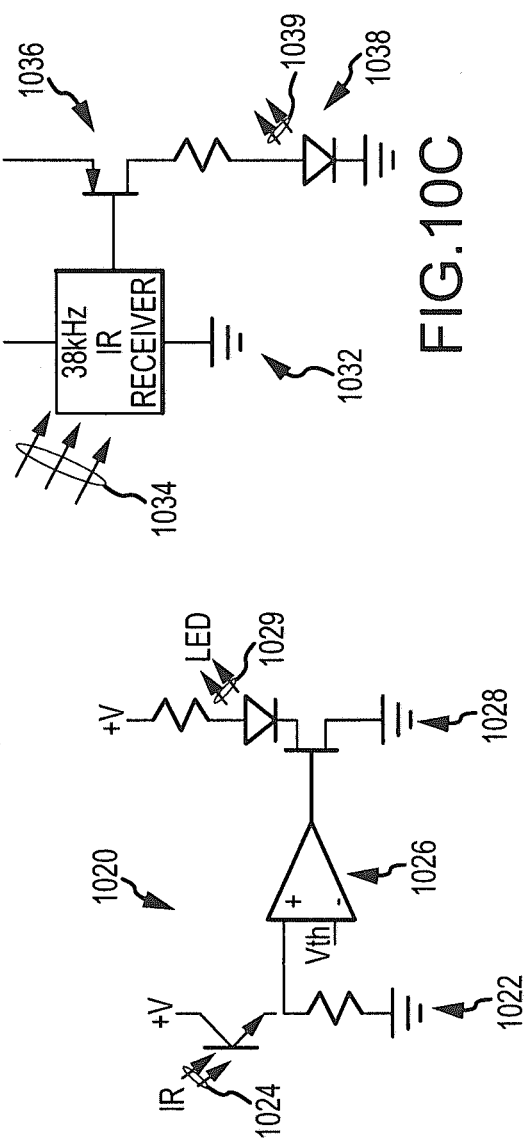

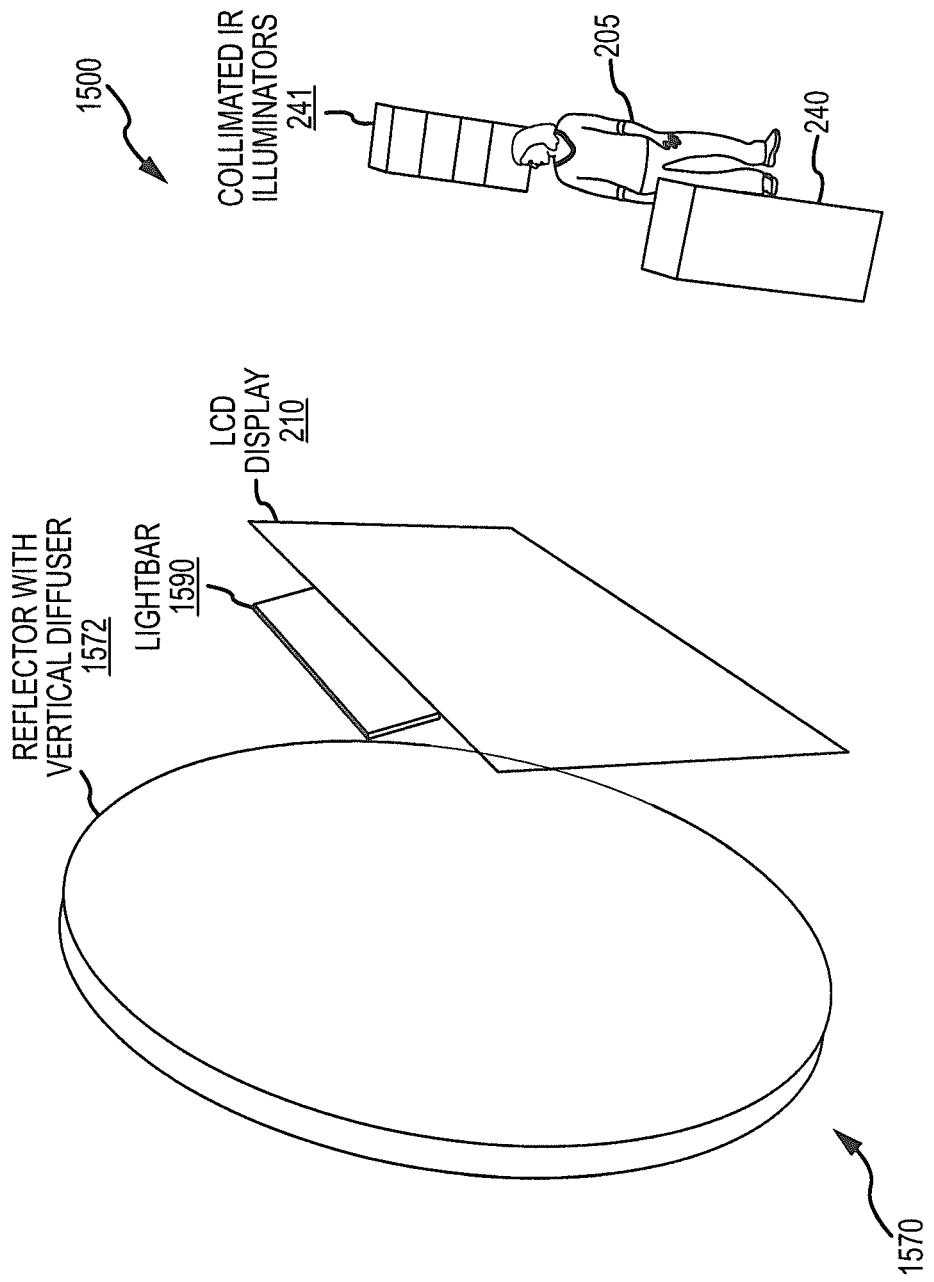

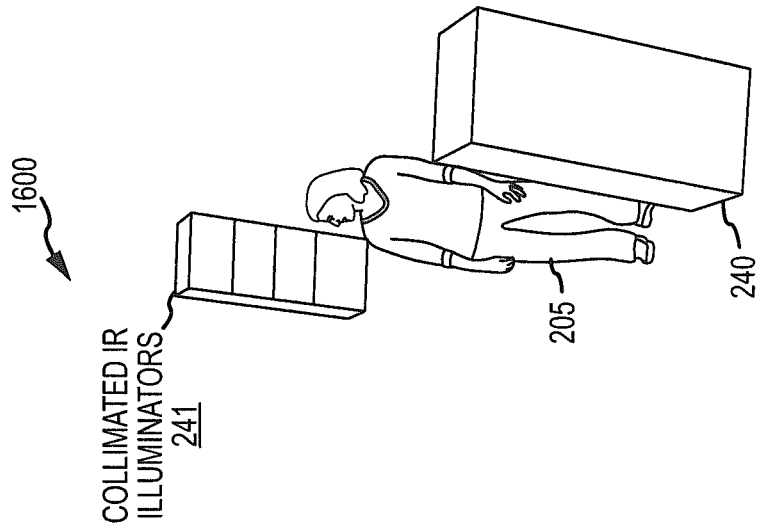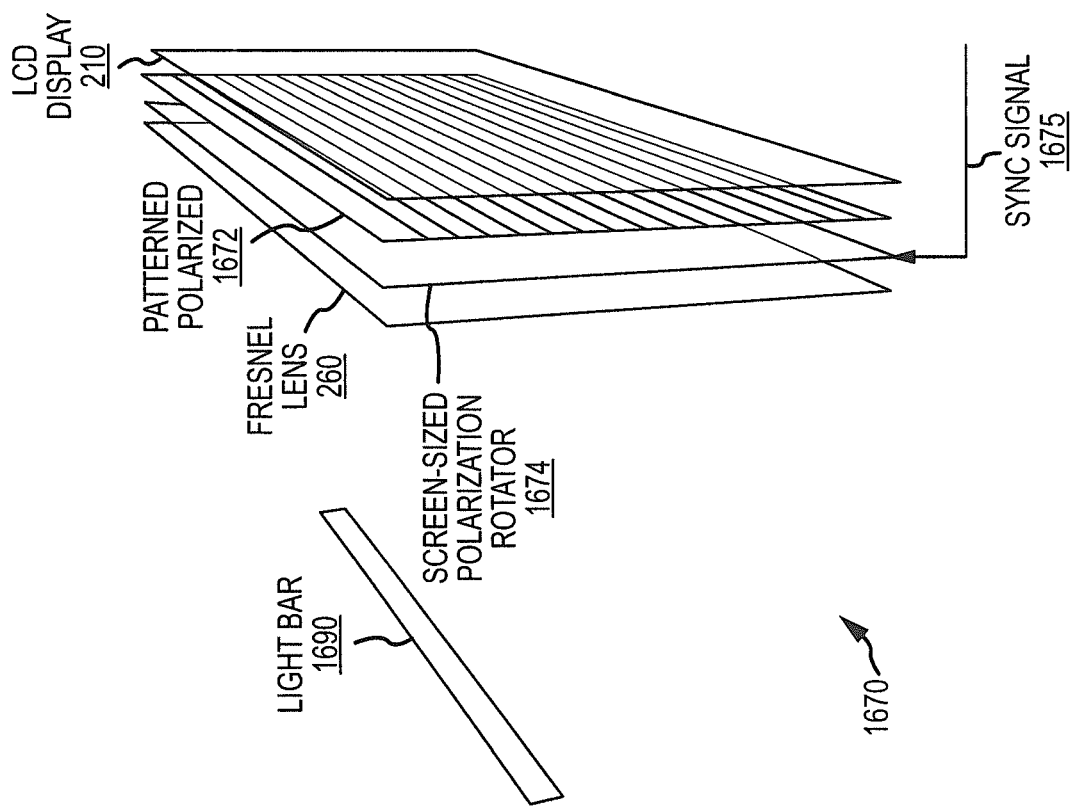
FIG.16

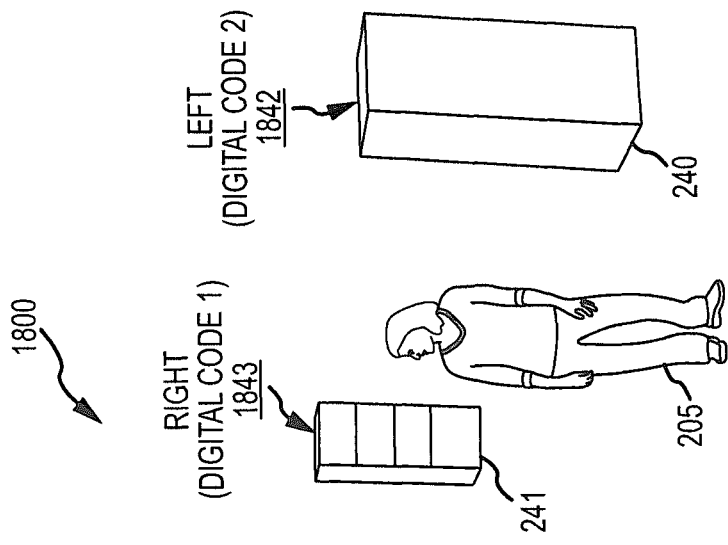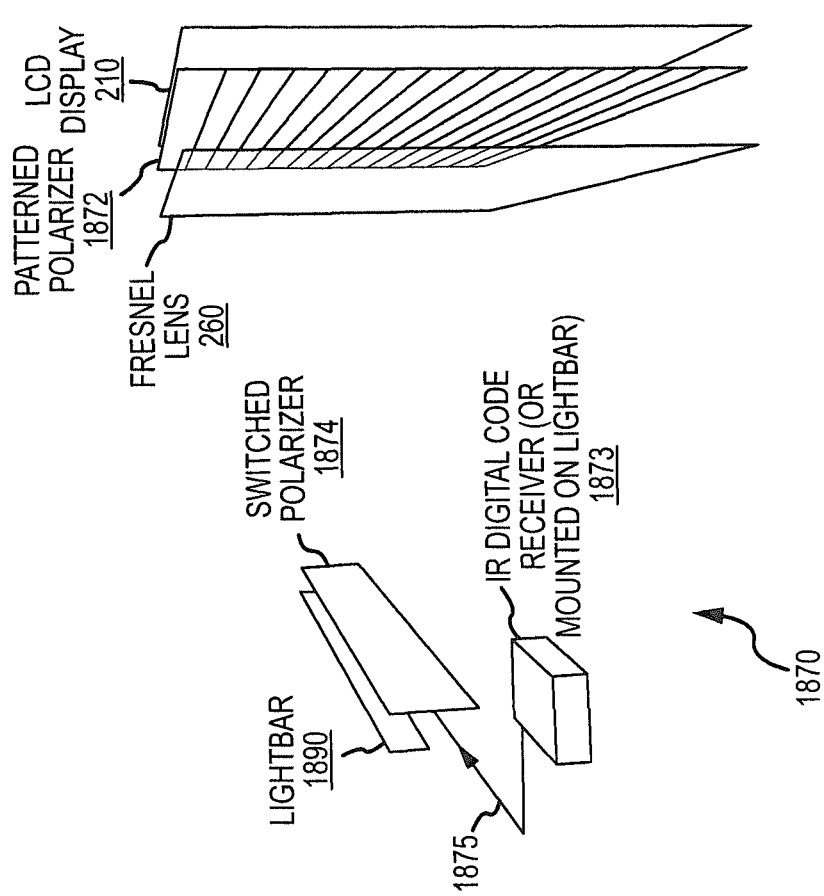
FIG. 18

LARGE AUDIENCE 3D DISPLAY SYSTEM WITHOUT GLASSES

BACKGROUND

1. Field of the Description

The present invention relates, in general, to devices and methods for providing a three-dimensional (3D) display in a glasses-free manner, and, more particularly, to a 3D display device providing back lighting and optics to present left and right eye images to each viewer's left and right eye, respectively, regardless of the position of the viewer within a viewer space (e.g., regardless of whether the viewer is in the front row or back row of a theater or ride vehicle with tiered seating and whether the viewer moves their head from side-to-side while viewing the 3D movie or display).

2. Relevant Background

Displays that provide the illusion of three dimensions have experienced a rebirth in the past few years. For example, a number of 3D televisions are now available for use in homes and home theaters. These 3D televisions generally operate by displaying a stream of left and right eye images in an alternating or time-multiplexed manner (e.g., left-right-left-right). Switching occurs so quickly that the viewer does not sense a flicker or change in the display. The viewer wears special headgear or glasses that operate in a synchronized manner with the display to only allow the light associated with the left eye image to reach the viewer's left eye and with the right eye image to reach the viewer's right eye.

For example, the 3D glasses may be shutter glasses that rapidly switch between allowing light to reach the left or the right eye, with the shuttering operation controlled to be time-synchronized with the display (e.g., a liquid crystal display (LCD) television monitor or the like). In other cases, the television monitor or display is configured to output two different types of polarized light to present the left and right eye images. In this case, the viewer typically wears glasses with two different lenses that are polarized in a manner to allow the left eye to view light from the display polarized in one manner and the right eye to view light from the display polarized in a second manner. Such polarized 3D glasses have been in use in theaters for many years.

While most commercial displays rely on the use of special 3D glasses, it is generally agreed by those in the 3D entertainment industry that displays able to provide a 3D viewing experience without glasses or headgear offer significant advantages. Presently, there are 3D display systems that can deliver left eye images to a viewer's left eye and right eye images to a viewer's right eye. However, these 3D display systems each have significant limitations. Some 3D display systems require the viewer to have their head in a specific position and to not move at all during the viewing experience as this may cause the wrong image to be viewed (e.g., the right eye to see the left eye image stream or vice versa) or to lose the image altogether. In other implementations, the viewer can move but complex tracking equipment is used to identify an approximate location of the viewer's eyes. The 3D display system then reacts to the new position by changing the output of the display to deliver the left and right eye images to the viewer. Both of these systems are generally limited to use with a relatively small audience, such as 1 to 4 viewers or the like, and these systems may be expensive to design and manufacture, which has resulted in only very limited adoption of such 3D display systems nationwide.

Hence, there remains a need for display technology that can provide 3D stereo images to audiences without the need for the audience members or viewers to wear glasses or special headgear. Preferably, such display technology would be suited for larger audiences of up to 20 to 40 or more members/viewers. Further, it is desirable that the technology be relatively inexpensive to implement (although this may not be a limitation in some settings) so as to allow more widespread use including home theater settings. Additionally, the 3D display technology should be adapted such that the viewers do not have to remain in one position throughout the experience (e.g., can move their head) and can be at various heights and viewing distances (e.g., seated in a theater or ride vehicle with rows of seats that are tiered with each row being further from the screen and higher from a reference plane to allow viewing that is unobstructed by viewers in lower rows).

SUMMARY

A 3D display system is described that addresses many of the problems associated with prior 3D displays in that the viewers do not have to wear glasses or headgear, can move during the viewing within a viewing space (at least within a predefined range of movements), and can be at differing viewing distances and heights. The 3D display system provides the capability of 3D viewing without glasses where it is known beforehand a general space or volume where each viewer's head will be positioned as is the case for a theater with seating and a vehicle ride. For example, a ride system may be adapted for providing 3D viewing, and passengers/viewers are strapped into seats while they are watching a 3D image. Similarly, a theater with individual seats (and, in some cases, bench seats) can be used as part of the viewing space of the 3D display system. In both of these examples, each of the viewers' heads is in a known position such as within a box that accounts for varying viewer heights. Further, the 3D display system is designed to provide stereo for each viewer or audience member even over a relatively large range of left, right, up, and down head movements (e.g., if the viewer remains seated or in a first anticipated position, they can move their head and still experience 3D images).

In one embodiment or implementation of a 3D display system, viewers view the 3D image on a large, but otherwise ordinary LCD monitor with the backlight removed (sometimes called a transparent LCD or LC display, herein). A similarly sized Fresnel lens (or other lens or lens system) is positioned behind (opposite the viewer side or display surface of the LC display) the LC display. The 3D display system includes two infrared (IR) light sources (e.g., invisible light sources such as IR LED lights) that are placed on the right and left side of each viewer and arranged to provide their light onto the viewer's face on the right and left side. These two lights are synchronized with the displaying of the left and right eye images on the LC display (e.g., left side of the face or area near their left eye is illuminated with IR light concurrently with display of the left eye image).

IR light reflected from the viewer's face (location of their eyes at the present time) passes through the LC display (i.e., LCD materials are typically transparent to IR light). This IR light is then focused by the Fresnel or other lens onto a thin horizontal strip of IR light detectors or sensors. Each of these sensors/detectors is matched or paired with a bright white LED emitter. In this manner, the image of a left or right side of the viewer's face is focused onto the strip of IR sensors, which results in one or more of the LED emitters being turned on so as to light up in bright white light at a location that matches or is proximate to (within 1 to 2 inches) the position of the IR sensor, which was hit by the IR light from the viewer's face (or approximate eye location).

This bright white light passes back along the same (or nearly the same) optical path as the IR light to pass through the lens and light up (provide back lighting of) the LCD so as to light up the appropriate side of the viewer's face (e.g., deliver the left or right eye image to the left or right eye of the viewer). In other words, the returning light from the LED emitter is "carrying" the image of the entire LCD appropriate to the particular viewer's eye. No one else in the viewing space (e.g., a theater) can see this light since it is exactly (or nearly so) and reciprocally being delivered to the specific viewer/audience member. The 3D display system is configured to provide this same action to every viewer or member in the audience as each viewer is receiving their eye-specific image from the LCD at their specific eye location in the viewing space. Because substantially all of the light from a lit visible light emitter is directed towards viewers' faces and eyes, the system can operate at a very high optical efficiency and can provide high brightness images for the audience using relatively little power.

In another embodiment or implementation of a 3D display system, the left and right sides of a viewer's face are continuously lit by two different wavelengths of infrared light (e.g., IR LED1 and IR LED2 providing wavelengths 1 and 2). Again, both wavelengths pass through the LCD and lens system to now focus on two light bars behind the LCD per seat (or viewer position). One light bar accepts wavelength 1 and the other wavelength 2. The white light emitters (white LEDs) for the two light bars have polarizers so that, for instance, IR light from the left side of the viewer's face is emitted back towards the viewer as vertically polarized white light and the other side as horizontally polarized white light. The LC display may be configured to show different images on the same screen based on the polarization of the light that is separately and directionally used to back light the LC display. The viewer only perceives left eye-destined light in their left eye and right eye-destined light in their right eye, which creates a smooth stereo viewing experience.

Interestingly, the IR-to-visible light bars are set up or positioned behind the LC display (or viewing screen) in places that are optically "conjugate" with the theater/vehicle seating (e.g., the expected positions of the viewer's eyes). In other words, the light bars are provided as tiered rows to match the tiered rows of the viewers' seats. This innovative technique allows the viewers to be served (with perfect fidelity) the stereo images (or 3D images) even though they are at varying distances from the screen and heights relative to a lower reference plane (e.g., a theater floor supporting the first or lowest row). In addition, the light bars may be curved to match the Petzval focusing surface of the optical focusing element.

In the above-discussed embodiments, vertical scattering is typically provided between the output of the light bars and the back side/surface of the LC display to provide a vertical strip of light to be delivered to the viewer's face. This accounts for viewer's moving their heads up and down and also provides a larger vertical payload of light to the viewer's face to increase the likelihood that the light will be delivered to their eye. Vertical scattering may be provided with an optical layer that is vertically scattering but horizontally transparent, and this may be provided with a sheet of horizontal lenticular array material, a vertically diffusing holographic film, or the like. The vertical diffuser (or vertical scattering film/layer) is positioned adjacent to the light bar or to the Fresnel lens and LCD (e.g., between the LC display and the light bar). This material makes the bundled light rays in the system more cylindrical (e.g., not dependent on the vertical position of the viewer or of the horizontal light strips). This means that viewers sitting in tiered rows are easily served and also that the placement of the horizontal light bars (horizontal rows of IR detectors and white LEDs) only has to be at the correct distance and angle to the screen (LC display) but can be mounted with relaxed height tolerances (as the vertical diffuser provides some tolerances/play).

More particularly, a display apparatus is provided that includes a display element and a display controller that first displays a left eye image and second displays a right eye image on or with the display element. The display apparatus also includes, within a viewing space adjacent a display surface of the display element, an illuminator assembly operable to provide infrared (IR) light in the viewing space. Further, the display apparatus includes a back light assembly that functions to generate visible light to back light the display element. The visible light is emitted in response to reflection of portions of the IR light from one or more viewers positioned at viewing locations in the viewing space.

In some embodiments, the display element includes a liquid crystal (LC) display that is transparent to the reflected portions of the IR light, whereby the reflected portions of the IR light passes through the display element. In such embodiments, the back light assembly may include a light bar made up of a row of IR receivers detecting the reflected portions of the IR light and a row of visible light sources each operating in response to one of the IR receivers detecting the reflected portions of the IR light. The display apparatus may include a focusing element positioned between the LC display and the light bar to first focus the reflected portions of the IR light onto the row of the IR receivers and to second focus light from the visible light sources into the viewing space through the LC display, whereby the LC display is back lighted.

In some cases, each of the IR receivers is paired with one of the visible light sources and each of the visible light sources comprises a white light emitting diode (LED). In some particular implementations, the paired ones of the LEDs and the IR receivers are spaced apart less than 1 inch horizontally so as to provide adequate horizontal eye-position density in the conjugate viewing positions in front of the display, and a receiving surface of the IR receiver and a light emitting surface of the LED are spaced apart an offset distance with the receiving surface more distal to the LC display. Further, the IR light may be IR modulated at 38 kHz and the IR receivers may be configured for detecting IR modulated at 38 kHz.

According to another aspect of the display apparatus, the illuminator assembly includes a number of left side IR illuminators and a number of right side IR illuminators. Each of the left and ride side IR illuminators may include an IR source and a collimator for generating the IR light to the viewing space. Each of the left side IR illuminators may be directed towards a left side of one or more of the viewer locations, and each of the right side IR illuminators may be focused onto a right side of one or more of the viewer locations. In such cases, the illuminator assembly may be operated in a time synchronized manner with the display element, whereby the left side IR illuminators operate concurrently with the first displaying and the right side IR illuminators operate concurrently with the second displaying. Further, the viewing space may include a number of tiered rows of individual seats for defining the viewing locations for the viewers and wherein the back light assembly comprises the number of the rows of the IR receivers and the visible light emitters arranged in tiers.

BRIEF DESCRIPTION OF THE DRAWINGS

FIGS. 10A-10C illustrate three embodiments back light assemblies showing a schematic of one IR receiver/detector and visible light emitter pair;

FIG. 15 shows another 3D display system using a spherical reflector as part of the back light assembly;

FIG. 16 provides a diagram of yet another 3D display system using polarizers to display left and right eye images to a viewer;

FIG. 18 illustrates a 3D display system similar to the systems of FIGS. 16 and 17 but using a switch polarizer with code;

DETAILED DESCRIPTION

Briefly, the present description is directed toward a 3D display system that uses invisible infrared (IR) light to determine the present location of each viewer's left and right eyes in an audience that may include 1 to many members. The viewers may be, for example, seated in individual seats in a theater or vehicle ride so that their heads are in known positions (e.g., accounting for height ranges and some range of side-to-side head movement such as in a known 3D space, volume, or "head box" that should contain each viewer's head). An IR light source is provided for the left and right side of each viewer's face and directs its light into the head box or viewer's eye-location space.

When a viewer is present in a seat/position, the IR light is reflected from their right or left side of their face (e.g., their left or right eye location). A 3D display device such as an LC display is used to alternate or switch between displaying a right and a left eye image (3D media stream made of right and left eye images), and the IR sources are time synchronized to operate with the 3D display device to illuminate the left side of each viewer's face when the left image is displayed and the right side when the right image is displayed. The 3D display device is transparent to IR such that a portion of the face-reflected IR light passes through the 3D display device (e.g., LCD with its back light removed).

A lens such as a large, planar Fresnel lens is positioned behind the 3D display device and acts to focus the IR light onto a light bar with a row of IR detectors each paired with a white light source (e.g., a bright, white light emitter such as an LED). When reflected IR light is detected by an IR detector, the light source paired with or associated with that detector is operated to emit white light (from nearly the same location as the IR detector) back towards the lens along the same or nearly the same optical path. The lens focuses the white light through the 3D display device (e.g., LC display) so as to provide a back lighting of the left or right image being displayed by the 3D display device. As a result, the light from the 3D display is emitted from the front surface of the 3D display so as to illuminate or strike the left or right side of the viewer's face (depending on whether the IR light that initiated this back lighting operation originated from the viewer's left or right side). In this way, each viewer in an audience receives left eye images with their left eye and right eye images with their right eye, and there is no need for 3D glasses or any special headgear.

Prior to describing several particular implementations of system components, it may be useful to first provide a discussion of an overall 3D display system and operation of its various components to eliminate the need for viewers to wear 3D glasses to view a 3D movie or other 3D media.

Figure 1:
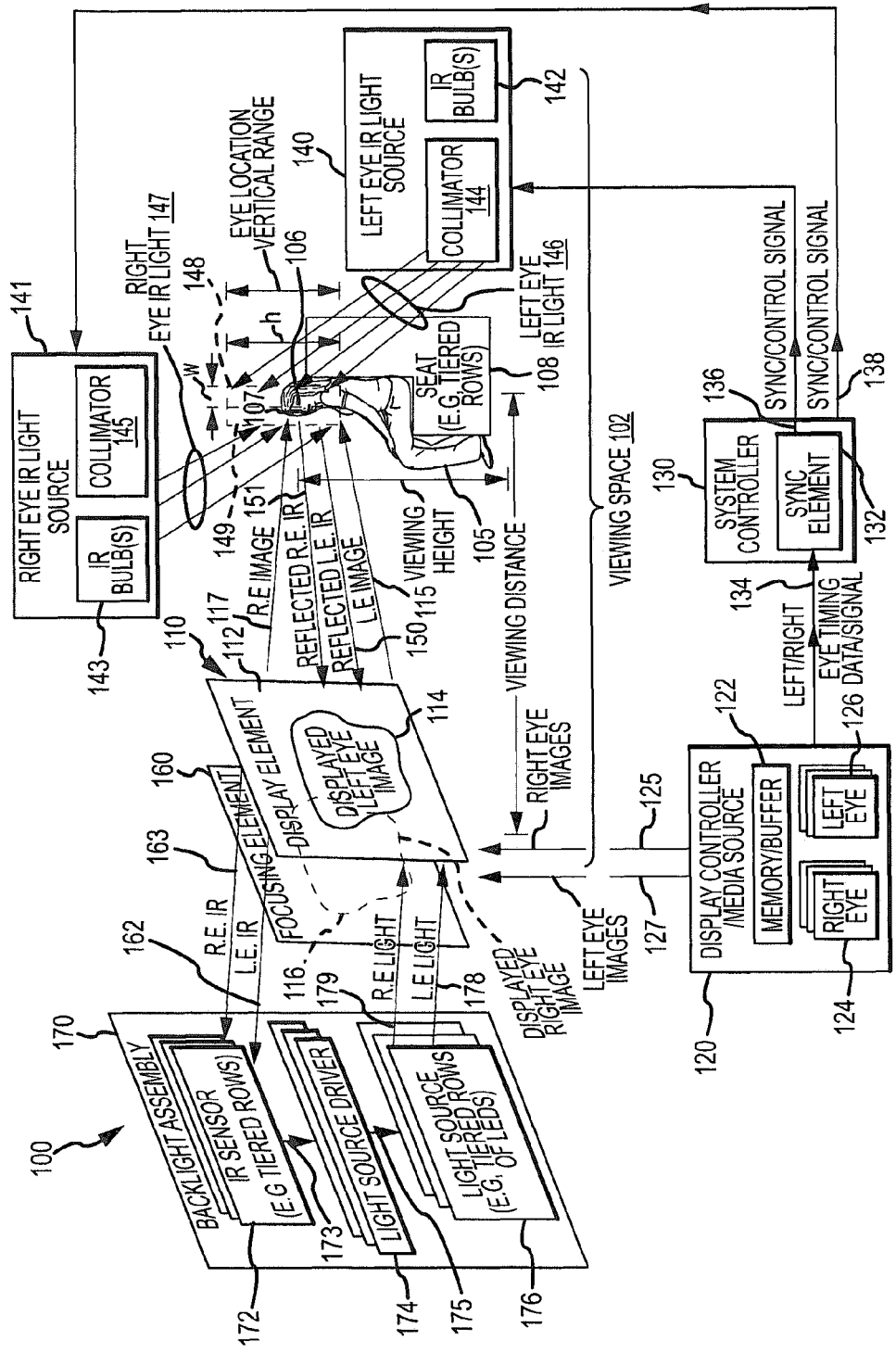
FIG. 1 illustrates a schematic and/or functional block diagram of a 3D display system that is particularly useful in providing an audience of viewers a 3D viewing experience without requiring special headgear such as 3D glasses and while allowing the viewers to sit (or be positioned) at numerous viewing positioned (e.g., in any seat in any of a number of tiered rows as is common in a theater or in a vehicle of an amusement park)

FIG. 1 illustrates a 3D display system 100 for use in providing a viewer 105 a 3D experience without the need for special glasses. The viewer 105 is shown to be positioned in a viewing space or volume 102 such as the interior of a movie theater, a home theater or a room in a house, a vehicle of an amusement park ride, and so on. The viewer 105 is in a seat 108 such as within any of a number of seats in any of a number of tiered rows of such seats 108. In other words, 3D display system 100 is shown in simplified form with only one viewer 105 and seat 108, but a typical 3D display system 100 would include 2 to 20 or more seats arranged in rows that are each at differing heights.

In this manner, each seat 108 places the viewer 105 at a different viewing distance from a front of display surface 112 of a display element 110 and also at a different viewing height as shown in FIG. 1 as being measured generally as the distance from the viewer's eyes 106, 107 and the surface 112 and the height of the eyes 106, 107 relative to floor or lower portions of the viewing space 102 (e.g., each successive row of seats 108 is some amount higher than the prior row (as is common in movie theaters and vehicles for 3D rides to provide each viewer 105 with a clearer view of the surface 112)).

The 3D display system 100 includes a display element 110 that, during operations of the system 100, functions to switch between or alternate back and forth between display of a left eye image 114 and a right eye image 116. This occurs synchronously with back lighting from a back light assembly 170, and the light associated with the left eye (L.E. in the figure) image 115 and the light associated with the right eye (R.E. in the figure) image 117 are directed outward into the viewing space 102 to the left and right eyes 106, 107, respectively (as discussed further below) of the viewer 105. More specifically, switching between each image 114, 116 may occur so rapidly that the viewer 105 cannot perceive any flicker with each image 114, 116 only displayed for a small fraction of a second (e.g., the left eye image 114 is displayed 60 times per second alternately with the 60 times per second display of the right eye image 116 or some other useful switching time for the images on surface 112).

The 3D display system 100 also includes a display controller or media source 120 that functions to selectively retrieve from memory or a digital image buffer 122 the digital right and left eye images 124, 126 (e.g., right and left eye images or frames of a 3D movie or the like). The controller 120 alternatively (time multiplexed) provides the image signals 125, 127 to the display element 110 for display via 112 as shown at 114 and 116. Operation of the media source/controller 120 and display element 110 may be similar to that of a conventional 3D television or display device that prior to the present invention had to be viewed using shuttered or polarized 3D glasses or other special headgear. For example, a conventional 3D television may be modified to implement the 3D display system 100 by replacing the back light components of a liquid crystal display (LCD) monitor with the focusing element 160 and the back light assembly 170 and by outputting left/right eye timing data/signals 134 to a system controller 130. In some systems 100, the display element 110 takes the form of a selectively transparent emissive display such as a transparent LCD panel or screen (or "transparent LC display"). The media source 120 may take the form of the 3D television control software and hardware.

To achieve a 3D experience without the need for glasses/headgear, the 3D display system 100 includes left and right eye infrared (IR) light sources 140, 141. The left eye IR light source 140 includes an IR bulb/light source 142 and its output is modified by a collimator or similar device 144 to provide left eye IR light 146 that is directed onto the left eye 106 of the viewer 105. The collimator 144 is provided such that the IR light 146 is generally rectangular in cross sectional shape in the area where the face of the viewer 105 is positioned. This is shown with the dashed box 148 that has a width, w, and a height, h (but, in practice the "box" 148 may be more irregular in shape). The size and shape of this IR light box (or head box) 148 is chosen, via the positioning of the IR light source 140 and configuration of the collimator 144, based on the position of the seat 108 in the viewing space so as to direct the IR light 146 onto a viewer 105 in the seat 108 and further to try to account for an expected eye location vertical range (shown in FIG. 1). This range is used to account for the differing height of viewers 105 that may use the seat 108 (e.g., small children up to taller adults). In one embodiment, the width, w, is in the range of 6 to 20 inches and the height, h, is in the range of 12 to 36 inches (or more), with the center of the box 148 generally being positioned at about the center of the expected vertical range of eye locations.

In this manner, the left eye IR light source 140 can be operated to "light up" the left side of the face of the viewer 105 including the area near the left eye 106. In a similar manner, the right eye IR light source 141 may be operated to provide right eye IR light 147 that has a box or other cross sectional shape as shown at 149. The IR light 147 strikes the right side of the face of the viewer 105 including in areas near the right eye 107.

The operation of the left and right eye IR light sources 140, 141 is controlled by sync/control signals 136, 138 provided in a switching or time multiplexed manner by a system controller 130. Hence, the left eye IR light 146 is provided during a first time period, the right eye IR light 147 is then provided in a second time period (with the left eye IR light source 140 being off or not providing light 146), and this is repeated during operation of the system 100. The duration of these time periods is matched to the time periods of the display of left and right eye images 114, 116 on the display element 110 by the controller 120. Similarly, the initiation of each IR pulse 146, 147 is synchronized with the signals 125, 127.

To this end, the system controller 130 includes a synchronization element or device 132 that operates to provide the control signals 136, 138 in a time synchronized manner relative to signals 125, 127. In other words, the 3D display system 100 operates to provide the left eye IR light 146 when the left eye images 127 are being used to operate the display element 110 and to provide the right eye IR light 147 when the right eye images 125 are being used to operate the display element 110. In one example, the timing data/signals 134 provided by the display controller 120 are the control signals intended for use in operating the left and right shutters of 3D shutter glasses intended for use with display element 110. In this way, when a left eye shutter would open, the left eye IR light 146 is provided by source 140 and when a right eye shutter would open the right eight IR light 147 is provided by source 141 (or light 146, 147 is not provided when a corresponding glass shutter is signaled to be closed by controller 120).

When "illuminated," the face of the viewer 105 alternately reflects the left and right eye IR light 146, 147. A portion of this light is reflected toward the front/display surface 112 of the display element 110 as is shown with arrows 150, 151, respectively. Significantly, the reflected L.E. IR 150 and reflected R.E. IR 151 originates from an area matching or at least generally corresponding with the present position of the left eye 106 and the right eye 107, respectively, of the viewer 105. The viewer 105 may move their head, and this would change the location of the eyes 106, 107. The 3D display system 100 is adapted to allow or compensate for such movement of the eyes 106, 107 while continuing to provide left and right eye images 115, 117 to the same area corresponding to the left and right eyes 106, 107 as was used for or involved in providing the reflected IR 150, 151. In other words, the left and right eye images 115, 117 substantially follow the same optical path as the reflected IR 150, 151, respectively, to ensure that the left and right images 114, 116 are viewed by the left and right eyes 106, 107.

To provide the left and right eye images 115, 117 on the same (or nearly so) optical path as reflected IR light 150, 151, the 3D display system 100 includes a focusing element 160 and a back light assembly 170 that are both positioned on a back side of the display element 110 (e.g., in a space opposite the viewing space 102). The display element 110 is chosen to be transparent to IR light including light 150, 151, and this may be achieved with a transparent LC display or similar display screen. As a result, the reflected IR light 150, 151 passes through the display element 110, and, when it strikes the focusing element 160, it is focused onto one of a plurality of IR sensors 172 provided in the back light assembly 170 as is shown with arrows 162, 163. The focusing element 160 may take a number of forms such as a planar, Fresnel lens, which may be sized and shaped to match the shape and size of the display element 110 (or be somewhat larger or smaller than the display element 110 in some cases).

For example, the IR sensors 172 may be arranged in tiered rows such as with a first row having a plurality of sensors 172, a second row having a plurality of sensors 172 that is further away from the display element 110 and at a second height that is greater than the height of the first row, and so on. The number of rows of sensors 172 may be chosen to match the number of rows of seats 108 in the viewing space. Similarly, the width of the rows, number of sensors 172, and spacing between adjacent pairs of sensors 172 may be varied to practice the 3D display system 100 and will typically be selected so that at least a portion of the focused IR light 162, 163 strikes one or more IR sensor 172. The sensitivity of the IR sensors 172 is also chosen to match the intensity of the IR light 162, 163 (e.g., the IR sources 142, 143 along with the fraction reflected 150, 151 to the display element 110 and lost via display element 110 and focusing element 160).

When IR light 162, 163 strikes an IR sensor 172, a signal 173 is generated that is received and processed by a light source driver 174 (one provided per sensor 172). The driver 174 is configured to trigger operation as shown at 175 of one (or more) of the light sources 176 paired with or associated with the IR sensor 172 that sensed/received the IR light 162, 163. As with the IR sensors 172, the light sources (e.g., a white LED or the like) 176 are arranged in tiered rows. In some embodiments, the light sources 176 are each a high illumination, white LED that has its operation triggered by sensing of IR 162, 163 by a sensor 172. The LED 178 may be positioned immediately adjacent (e.g., within 1 to 2 inches with some configurations placing a row of LEDs within 0.5 inches from a row of associated IR sensors) to the sensor 172. Such close positioning is used such that the generated light 178, 179 retraces the optical path followed by IR 162, 163 to the focusing element 160 for return to the eye 106, 107 as left and right eye images 115, 117.

As shown, receipt of left eye IR 162 is sensed by an IR sensor 172, and a driver 174 operates a light source 176 paired to the IR sensor 172 to generate left eye light 178 (e.g., white light). The left eye light 178 strikes focusing element 160 which focuses or directs the light 178 through the displaying element 110. This acts to back light the display element 110 such that (due to synchronization of signals 127 and 136) the left eye image 114 is visible on display surface 112 as light or left eye image 115 travels along the same (or a similar) path as reflected left eye IR 150 to reach the left eye 106 of the viewer 105.

Then, similarly, when the controller 120 switches to the right eye images 125, an IR sensor 172 senses right eye IR 163. In response, a signal 173 is provided to driver 174, which operates as shown at 175 a light source 176 to produce right eye light 179. The right eye light 179 originates from a location nearly identical to the IR sensor 172 paired with the light source 176 such that the light 179 strikes the focusing element 160 and is focused through the display element 110 onto the right eye 107 of the viewer 105. In other words, in this second operating time period, the right eye image 116 is backlit by the back light assembly 170, and a right image or light 117 associated with image 116 is transmitted along an optical path matching the path of reflected right eye IR 151 through the viewing space 102 to reach the right eye 107 of the viewer 105.

This operation or switching between right and left eye images (and operation of right and left IR light sources 141, 140) is repeated on an ongoing basis to provide a 3D viewing experience for viewer 105 without the need for special glasses and without requiring the viewer 105 to hold their head still as head orientation and eye location is indicated by the optical path of the reflected right and left eye IR 150, 151 throughout operation of the 3D display 100.

Figure 2:
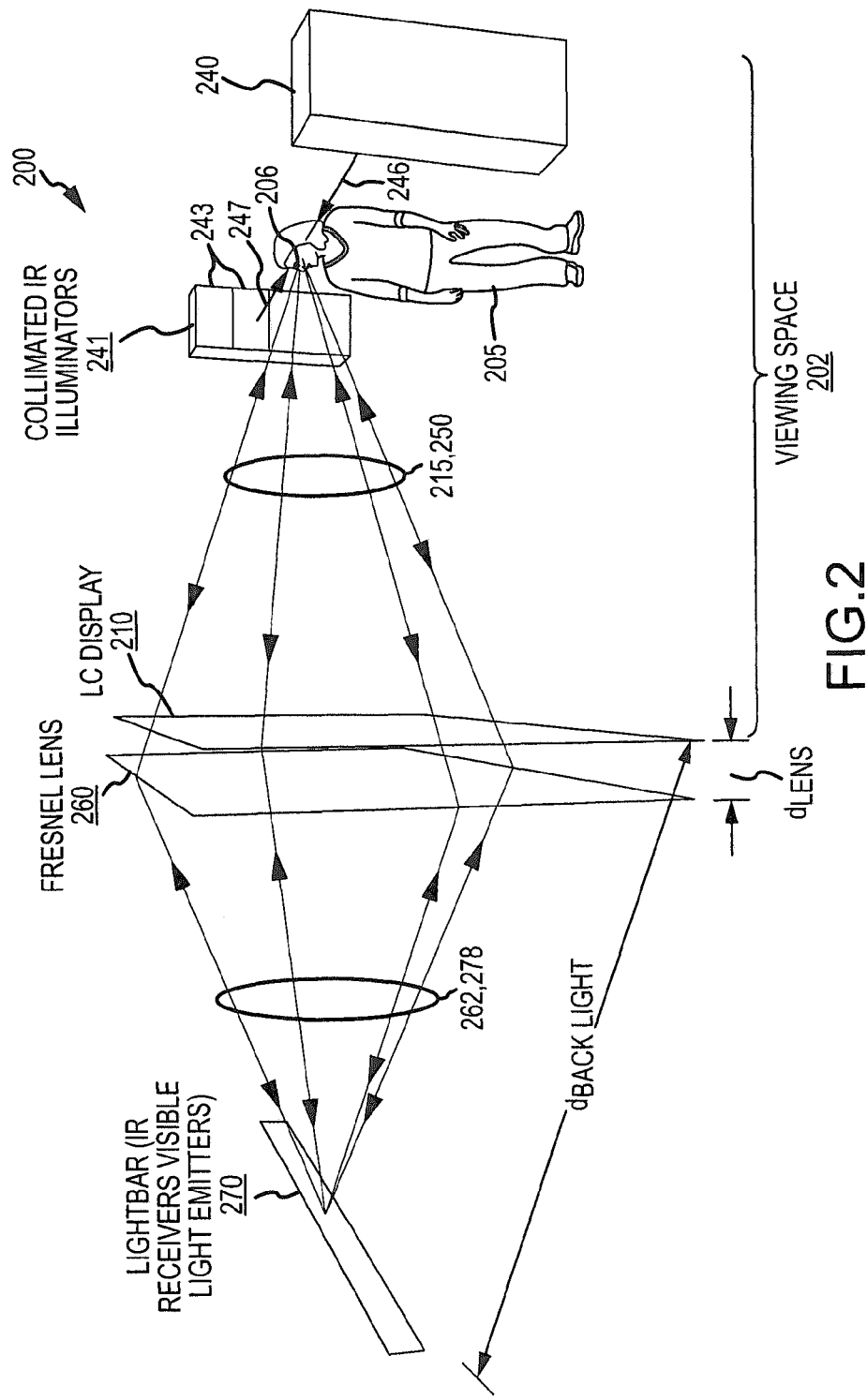
FIG. 2 illustrates a diagram of one exemplary implementation of a 3D display system that may be used to provide the components and/or functionality of the system of FIG. 1.

FIG. 2 illustrates a 3D display system 200 that is being operated to deliver 3D images to a viewer or audience member 205. The viewer 205 is shown to be standing in a viewing space 202, but, more typically, the viewer 205 would be positioned in an individual seat in one of a number of tiered rows (as in a theater or amusement park vehicle). The viewing space 202 is in front of a LC display 210, and each viewer 205 (one shown for convenience but more typically the system 200 would be used for 2 to 20 or more viewers) is in one of a number of predefined viewing positions. More accurately, their head is within one of a number of locations (e.g., viewing spaces or volumes that may be called "head boxes"). In this way, invisible light such as IR light can be used to illuminate the left and right sides of their faces in an alternating manner (time-multiplexed illumination that is synchronized to left and right image displaying on LC display 210).

In this regard, the system 200 includes a pair of collimated IR illuminator assemblies 240, 241. The first assembly 240 is used to illuminate the left side of the face of the viewer 205 with collimated IR as shown at 246 (and her left eye 206) while the second assembly 241 is used to illuminate the right side of the face of the viewer 205 with collimated IR as shown at 247. Again, the left or first assembly 240 is operated when left eye images are shown on LC display 210 and the right or second assembly 241 is operated when right eye images are shown on LC display 210.

Each assembly 240, 241 is configured with a number of IR light sources (as shown at 243 for assembly 241) arranged to illuminate the viewing positions (and viewers 205) positioned between the assemblies 240, 241. For example, a theater row of seats may be positioned between the assemblies 240, 241 (e.g., the assemblies 240, 241 may be mounted on the side walls of the theater or ride vehicle), and the row may include four individual seats. In this example (as shown), the assembly 241 (and 240, too) may include a number of IR illuminators 243 (e.g., an IR emitter paired with a collimator element), the group being angled so as to cause the IR light to project onto a more contiguous surface area such as a more rectangular area arranged vertically on end to illuminate a viewer's face with the viewer's head positioned at a range of viewing heights while in a particular seat of a row).

Alternatively, individual, and smaller, IR light sources can be mounted at the left and right sides of each individual seat position, e.g., as part of a head bolster. This bolster can be designed to be adjustable in height so as to adjustably light the left and right side of each audience member's face. These individual seat lights can still be interconnected so that all left side illuminators are illuminated when the left side image is displayed on display element 110 and so that all right side illuminators are illuminated when the right side image is displayed on display element 110.

As shown, illuminators of the left assembly 240 are presently being operated to provide IR light 246 that strikes and illuminates the left side of the face of the viewer 205 (including her eye 206). At this time, the assembly 241 would be turned off or not be projecting IR 247 (as only one of the assemblies 240, 241 is operated at a time in the 3D display system 200). A portion of this IR 246 is reflected as shown at 250 towards the LC display 210. The LC display 210 is transparent (or at least mostly transparent) to the IR 250 such that this light strikes the Fresnel lens 260, which is separated by a small distance, $d_{Lens}$, of less than about 6 inches or abuts the back side of LC display 210. The Fresnel lens 260 typically is the same shape and size of the LC display 210 to receive all of the light 250.

The 3D display system 200 also includes a light bar 270 positioned a distance, $d_{Back\ Light}$, behind the LC display 210 (opposite the viewing space 202). The distance, $d_{Back\ Light}$, is chosen based on the configuration/design of the lens 260 and the distance to the viewer 205 such that the focused IR light 262 is directed onto the light bar 270. In other words, the light bar behind the LC screen and lens is in a position conjugate to viewer's head positions in front of the LC screen. As with the assemblies 240, 241, the number of light bars 270 is chosen to match the number of viewing rows in the theater/vehicle ride (or other viewing space) 202. For example, if there are 3 rows in the viewing space 202, the 3D display system 200 will include 3 of the light bars 270 (with their distance and height relative to the LC display 210 and lens 260 chosen to cause the focused IR light 262 to strike a light bar 270 paired with a row of viewers/viewing locations). The focusing of the lens 260 may allow the light bar 270 to be closer to the LC display 210 than the viewer 205, and the distance, $d_{Back\ Light}$, will vary to suit the viewing distance of the viewer 205 as well as the lens 260 (e.g., the distance, $d_{Back\ Light}$, may be one fourth to one tenth or less than that of the viewing distance to the viewer 205). In order to more finely place each IR/visible light couple at the conjugate position to viewers in front of the system, the entire light bar may be curved (not shown in the figures but readily understood by those skilled in the optical/display arts) to match the Petzval focusing surface of the focusing element used.

The light bar 270 includes a row of IR receivers (detectors or sensors) that are each used to trigger operation of a visible light emitter (e.g., a white LED or the like). Hence, as shown, the light 262 is focused by the lens 260 onto the light bar 270, which functions to respond by generating light 278 (e.g., white light) at about the location where the IR light 262 struck the light bar 270. This visible light 278 returns along the path of the focused IR light 262 to the lens 260, which focuses it through the LC display 210, which acts to back light it and display a left eye image (in this operating example of system 200). The left eye image 250 (or light "carrying" this data/image) is focused by the lens 260 onto the face of the viewer 205 so that it is perceived or received by the left eye 206 of the viewer 205. In this way, the display system 200 operates at a first time to illuminate the left side of the viewer's face with IR 246, and this causes the left eye image 250 to be nearly instantaneously provided to the viewer 205 at the present location of their left eye 206.

Figure 3:
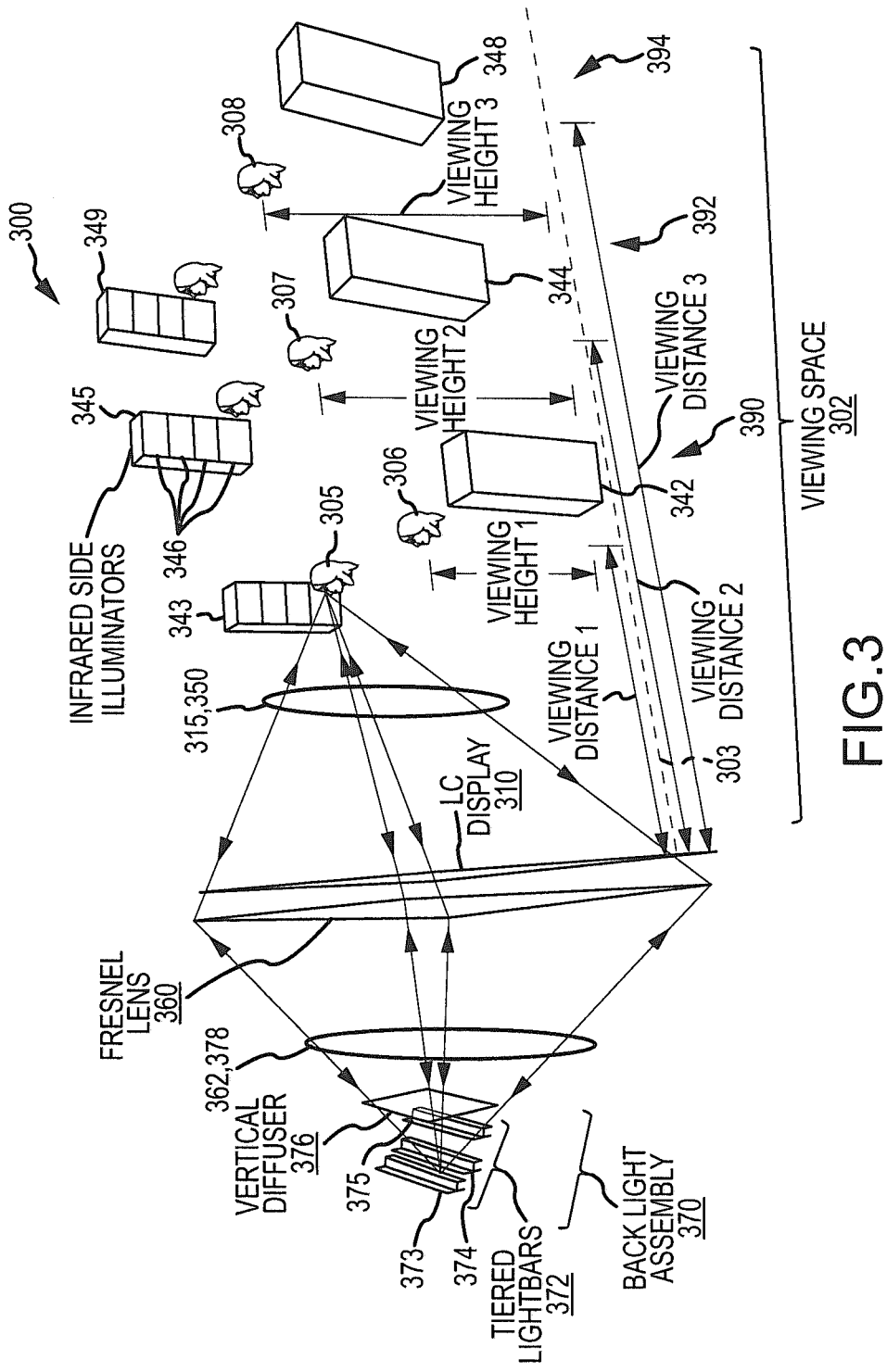
FIG. 3 illustrates a diagram of a 3D display system similar to that of FIG. 2 with modifications to show use of multiple, tiered rows of light bars (row of IR detector and white LED pairs) to serve stereo images to a viewing space associated with a seat (or other viewer positioning device) in one of multiple, tiered rows of such individual seats (or viewer positioning devices)

FIG. 2 illustrates a 3D display system 200 with a simple, one row viewing space for viewers in four spaces between two illuminator assemblies. In contrast, FIG. 3 shows a 3D display system 300 configured for use with three tiered rows of seats, with the seats not specifically shown but these or other viewer positioning devices being used to position the viewers whose heads are shown.

Particularly, the 3D display system 300 has a viewing space or volume 302 in front of a display or front surface of a 3D display device 310 such as a transparent LC display (an LCD monitor with at least the back light portion removed). A number of viewers are shown in the display space 302, and viewers 305 and 306 are in a first, lower row 390 with a first viewing distance, Viewing Distance 1, as measured from the LC display 310 to the viewer's head/eye locations. The viewers 305, 306 are also at a first viewing height, Viewing Height 1, relative to the space floor or a horizontal reference plane 303. Viewer 307 is in a second and higher row 392 with a second viewing distance, Viewing Distance 2, that is larger than the first viewing distance and with a second viewing height, Viewing Height 2, that is greater than the first viewing height. Further, viewer 308 is in a third and still higher row 394 with a third viewing distance, Viewing Distance 3, that is larger than both the first and second viewing distances and with a third viewing height, Viewing Height 3, that is larger than the first and second viewing heights. in this way, the viewers 305, 306, 307, 308 are placed in individual and predefined viewing locations in one of three tiered rows 390, 392, 394. Light bars are generally placed optically conjugate to these viewing positions behind the LC screen and Fresnel lens.

The rows 390, 392, 394 are each located between a pair of side illuminator assemblies that are used to selectively wash the left and right sides of the viewer's faces with invisible, IR light, which is synchronized with display of left and right images on the LC display 310. For example, the first row 390 is IR illuminated by left and right illuminator assemblies 342, 343, which each includes an IR source and collimator that is targeted/focused so as to emit IR over an area associated with a viewer's head (left and right sides of their faces such as faces of viewers 305, 306). The second row 392 is IR illuminated by left and right illuminator assemblies 344, 345 to illuminate the left and right sides of the face of viewer 307 (with assembly 345 shown to include 4 illuminators which may be useful if each row 390, 392, 394 includes 4 seats but fewer or greater numbers may be used to suit the number of seats in a row). The third row 394 is IR illuminated by left and right illuminator assemblies 348, 349 to illuminate the left and right sides of the face of the viewer 308.

During operation of system 300, the left assemblies 342, 344, 348 are operated concurrently when a left eye image is displayed on LC display 310 and the right assemblies 343, 345, 349 are operated concurrently when a right eye image is displayed on LC display 310. This results in the reflected IR from all the left sides of the viewers' faces striking the LC display 310 concurrently (and the LC display 310 to be back lit by light bars to return the left eye images to the viewers) and the reflected IR from all the right sides of the viewers' faces striking the LC display 310 concurrently (and the LC display 310 to be back lit by light bars to return the right eye images to the viewers).

FIG. 3 shows operation of the system 300 at a first time when a left eye image is being displayed on the LC display 310. At this time, the left assemblies 342, 344, 348 are each operated to provide IR light on the left side of the viewer's faces (as discussed with reference to FIGS. 1 and 2). As shown for viewer 305, this results in reflected IR 350 being directed onto the LC display 310, which is transparent to IR light such that it passes through to strike Fresnel lens (or other lens) 360. The lens 360 acts to focus the reflected IR light as shown at 362 into a back light assembly 370.

The back light assembly 370 includes a set/assembly 372 of tiered light bars 373, 374, 375 that are arranged in a predefined and/or experiment-proven arrangement and positions so as to receive the IR light 362 from the lens 360. Particularly, the back or third row 373 is positioned to receive the light from faces/viewers 305, 306 in the first row 390, the middle or second row 374 is positioned to receive the light from faces/viewers 307 in the second row 392, and the front or first row 375 is positioned to receive the light from faces/viewers 308 in the third row 394. The rows of light bars 373, 374, 375 are tiered to be at differing heights and distances from the back of the LC display 310 and lens 360 (but with a conjugate arrangement).

As shown in FIG. 3, light 350 reflected from the front row viewer 305 is focused as light 362 onto an IR detector in the third or back row 373. This results in a white or visible light source in the light bar 373 being activated to emit light 378 back towards the lens 360 and LC display 310 (along substantially the same optical path(s)). A vertical diffuser 376 is provided between the light bars 373, 374, 375 and the lens 360 such that the light from each light source on the light bars 373, 374, 375 is stretched or diffused in the vertical direction, and, as discussed above, this is useful to allow light from a point source to be made to fill a larger vertical area when the light reaches the rows 390, 392, 394 in the viewing space 302, e.g., to provide light "carrying" a left or right eye image to strike a vertical dimension of a head box/viewer eye position range. For example, the light may be diffused by vertical diffuser 376 to provide a vertical band of light (image 315) that is between 6 and 24 inches when it reaches the viewers' eyes.

The diffused IR light 378 strikes the lens 360 and is focused through the back of the LC display 310. This causes the LC display 310 to, in turn, be back lit through the action of the light bar, and, because the operation of the illuminator assembly 342 is synchronized with display of a left eye image on LC display 310, the light 315 illuminates the left side of the face of the viewer 305 with a left eye image. In this way, the left eye of the viewer 305 receives a left eye image during the operating state of system 300 shown in FIG. 3. Although not shown for ease of description, viewers 306, 307, 308 would concurrently be receiving a left eye image from display 310, but along differing optical paths as the IR light reflected from their faces would define unique optical paths for return of back lighting from the back light assembly 370. In other words, the reflected light from each of the viewer's faces causes differing ones of the IR detectors of light bars 373, 374, 375 to sense IR light and trigger operation of differing ones of the LEDs/visible light sources to provide back lighting 378. This differing back lighting 378 is focused by lens 360 to return back to each viewer along the paths of the reflected IR light 350 and back to their left eyes (in the example of FIG. 3).

Figure 4:
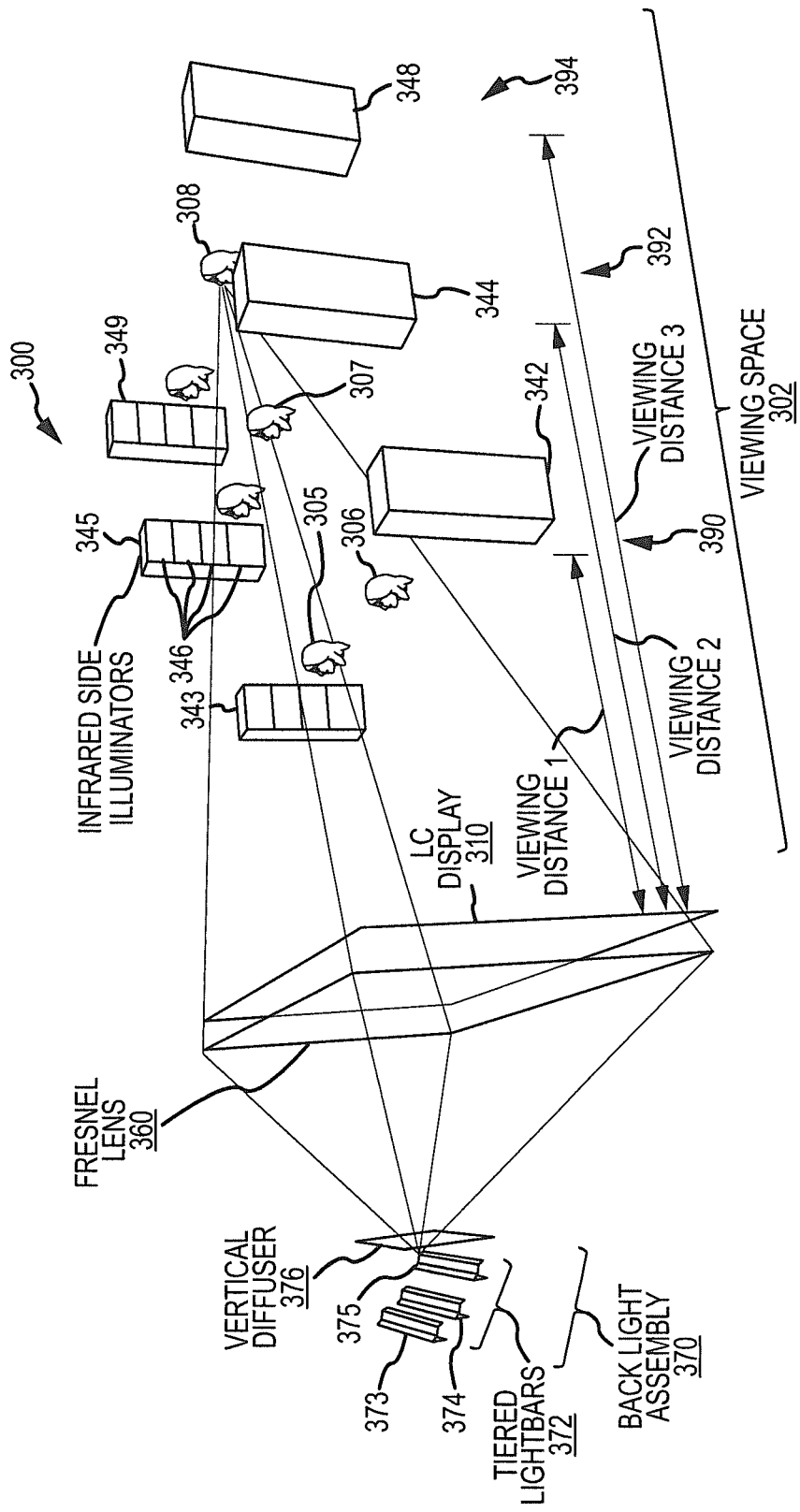
FIG. 4 illustrates the 3D display system of FIG. 3 operating to provide a left eye image to a viewer in back or third row of the viewing space.

FIG. 4 illustrates the 3D display system 300 during the same operating state as in FIG. 3 to deliver a left eye image to a different viewer. Particularly, while the viewer 305 is presented a left eye image 350 as shown in FIG. 3, the viewer 308 in the back or third row 394 also receives a left eye image 315. To this end, the left illuminator assembly 348 is operated to wash the left side of the face of the viewer 308 with invisible IR light (e.g., with an IR LED and a collimator).

The reflected IR 350 at least partially reaches the front/display surface of the LC display 310 and passes through this IR-transmissive material/element. The lens 360 focuses the IR light 362 onto the front or first light bar 375 in the back light assembly 370, e.g., the back row 394 focuses its IR light onto the front row 375 of the light bars 370. One or more detectors of IR generates an output signal that a driver or other device uses to trigger operation of a paired visible light emitter (e.g., a bright white LED or the like), and visible light 378 is emitted back along the same optical path(s) as the focused IR light 362. The lens 360 receives this visible (e.g., white) light 378 and focuses it through the LC display 310 (or back lights the LC display), and this causes the presently displayed left eye image to be directed with light 315 onto the left eye of the viewer 308. In this way, IR light striking the viewer's face on or near their left eye triggers display of a left eye image via light from a back lighting source in light bar 375 in a manner that causes light 315 to travel to their left eye (and not their right eye or to any other viewers' eyes).

Figure 5:
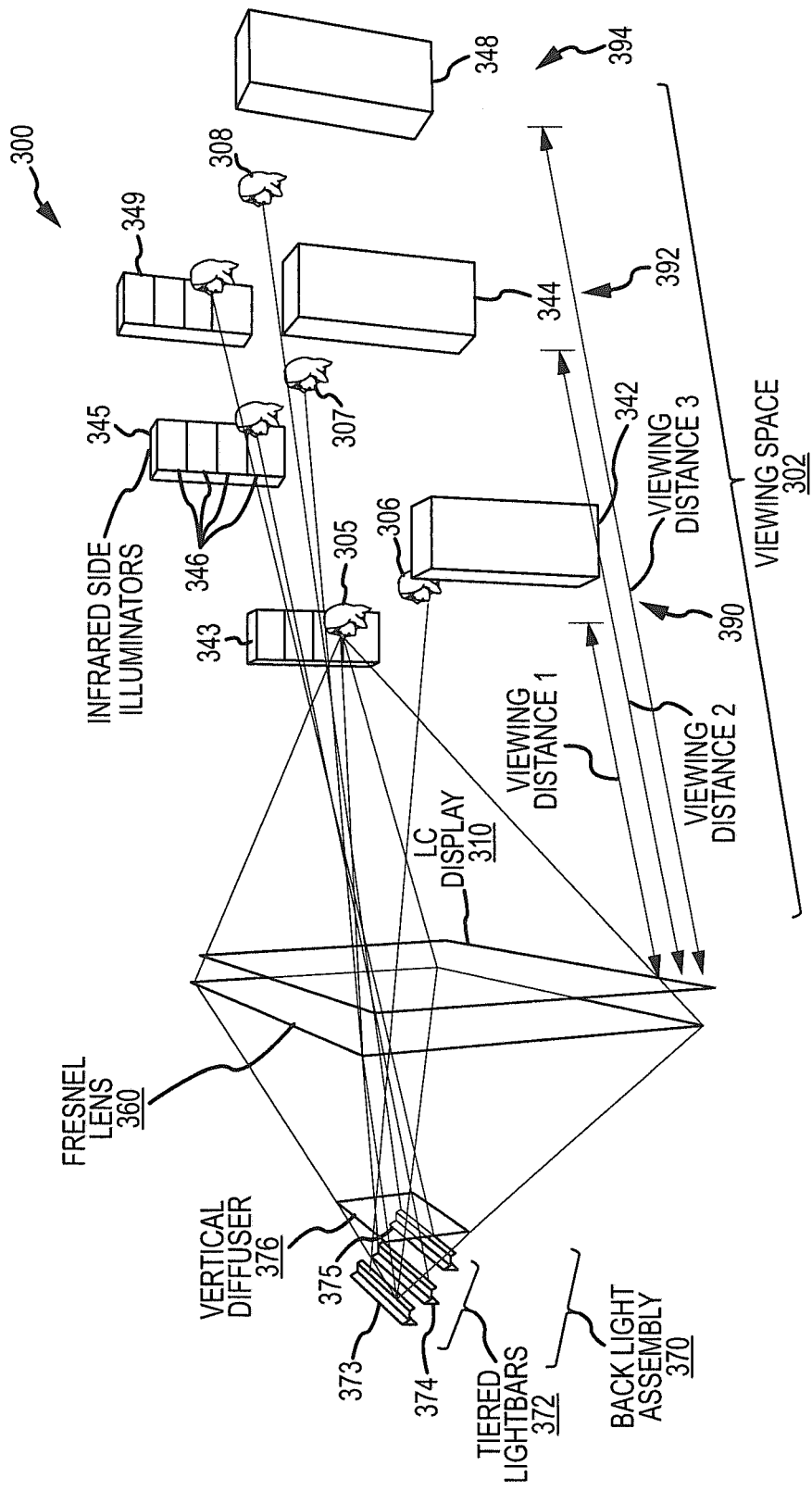
FIG. 5 illustrates the 3D display system of FIGS. 3 and 4 operating to concurrently provide left eye images to each viewer in the three rows of the viewing space (e.g., in individual seats of tiered rows of a theater or ride vehicle)

FIG. 5 is intended to show the operation of the 3D display system 300 to concurrently deliver left eye imagery 315 to each of the audience members or viewers 305, 306, 307, 308. Each receives their own left eye image light stream 315 in response to their faces reflecting IR light 350 onto the LC display 310. The lens 360 concurrently focused these various light streams 350 onto differing ones of the tiered light bars 373, 374, 375, which causes differing ones of the IR detectors/sensors to sense the light 362 from each viewer 305, 306, 307, 308 and trigger operation of a paired LED or other visible light source. Light 378 travels from each of these point light sources on bars 373, 374, 375 to the viewers 305, 306, 307, 308 via lens 360 and LC display 310 as shown with rays 315 (which provide left eye images shown on LC display 310 in a manner that is synchronized with operation of the left illuminator assemblies 342, 344, 346). In this way, a viewer may sit in any row 390, 392, 394 of the viewing space 302 and view a 3D show.

While not shown, the right illuminator assemblies 343, 345, 347 would be operated concurrently with each other and in a manner that is time synchronized with operation of the LC display 310 to display right eye images. In other words, the left illuminator assemblies 342, 344, 346 would be operated in a first time slot/period followed by the right illuminator assemblies 343, 345, 347 being operated in a second time slot/period. This pattern would be repeated as would operation of the LC display 310 to show a 3D image stream by showing images for viewing by the left eye, the right eye, the left eye, the right eye, and so on.

Figure 6:
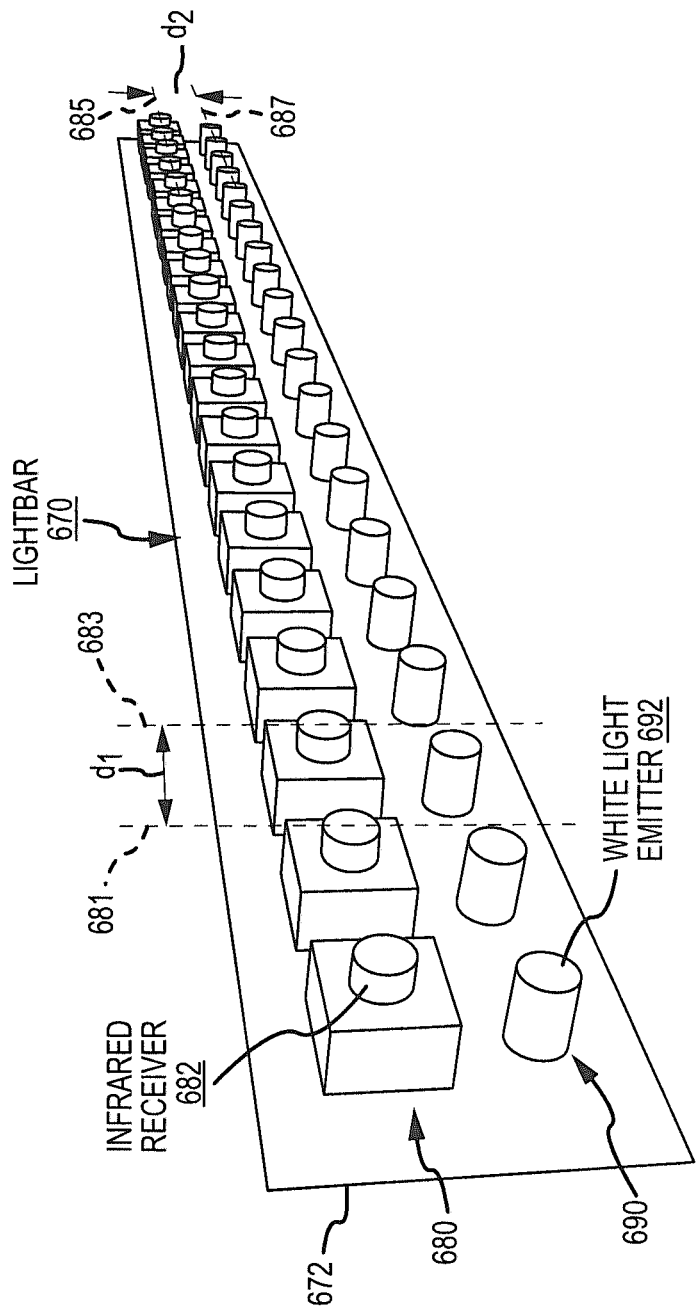
FIG. 6 is a perspective view of an exemplary light bar that may be used in a 3D display system such as the system of FIG. 3.

The light bars 373, 374, 375 of system 300 may be implemented in a number of ways. For example, but not as a limitation, FIG. 6 illustrates a perspective view of one useful light bar 670 that may be used to provide the functionality of a light bar of a back light assembly in a 3D display system. The light bar 670 includes a base or body 672 that is used for supporting or mounting a detector/sensor row 680 and a light source/emitter row 690.

The two rows 680, 690 are linear as shown with lines 685, 687 extending along the lengths of the two rows 680, 690 (such as through center points of IR receivers 682 and of white light emitters 692), and the two rows 680, 690 are parallel to each other on the base/body 672. The two rows 680, 690 are spaced apart a relatively small distance, $d_2$, as measured between center points of paired devices 682, 692 or lines 685, 687, so that, when light is received by a receiver 682, a paired or adjacent emitter 692 emits visible light (e.g., white light) from nearly the same location on the light bar 670 (or body 672). In this way, the light from the emitter 692 returns to the source of the received IR light or to a viewer's face and, particularly, to their left or right eye.

The side spacing, $d_1$, between side-by-side receivers 682 and between side-by-side emitters 692 (as measured between two lines 681, 683 passing through the center of the devices) is also minimized or kept relatively small. In this way, any IR striking the light bar 670 is more likely to strike a receiver 682 in the row 680. This close spacing, $d_1$, (e.g., less than 0.5 inches and more typically less than 0.25 inches) allows the viewer to move their head side-to-side in their seat while still having a receiver 682 available and in the correct position on the light bar 670 to receive IR reflected from their face (i.e., the light bar 670 is not only configured for receiving reflected IR from a row of viewing positions but also the viewing positions each may have a horizontal range (such as 12 to 24 inches per viewer or the like)).

The IR receivers 682 may take the form of off-the-shelf sensors/detectors such of the type of infrared receivers often used in LCD and other television monitors. These may be specially suited to be particularly sensitive for IR that is within a predefined frequency range. With this in mind, a prototype of the light bar 670 uses IR detectors 682 that are configured for detecting a 38 kHz modulated signal (but other frequencies may be used), and the IR source in the side illuminators placed in the viewing space are controlled to illuminate viewers' faces with IR modulated at 38 kHz. In way, the IR sensors 682 may require significantly less power, may be inexpensive to obtain (e.g., use an existing standard), and provide highly robust detection of the reflected IR light striking the light bar 670 on row 680.

Likewise, the white light emitters 692 may generally be any device useful for providing visible light rapidly (in response to an output signal from an IR detector 682) and at high illumination levels (to properly back light an LC display). To this end, bright white LEDs may be used to provide point sources 692 of visible light at or nearly at the location of a particular IR detector 682. Alternatively (not shown), the white light emitters may be vertically stacked (from the plane of the light bar) multicolored LEDs. For instance red, green and blue LEDs with substantially transparent cases may be stacked with the blue LED closest to the Fresnel lens and viewer and the red LED furthest from the Fresnel lens and viewer, with the green LED centered between them. This can be done to compensate for chromatic aberration in a Fresnel lens since shorter wavelength light will focus closer to the LED group and longer wavelength light further from the LED group.

In FIG. 6, the light bar 670 is configured such that the front receiving and emitting surface, respectively, of the IR detector 682 and the light emitter 692 are coplanar. This may be useful in some applications. In other cases, though, it was recognized by the inventors that the reflected IR light was focusing behind the visible light such that it may be useful to adjust the heights of the IR sensors (or the light emitters) so as to place the receiving surfaces of the IR detectors further away from the focusing lens than the visible light emitters.

Figure 7:
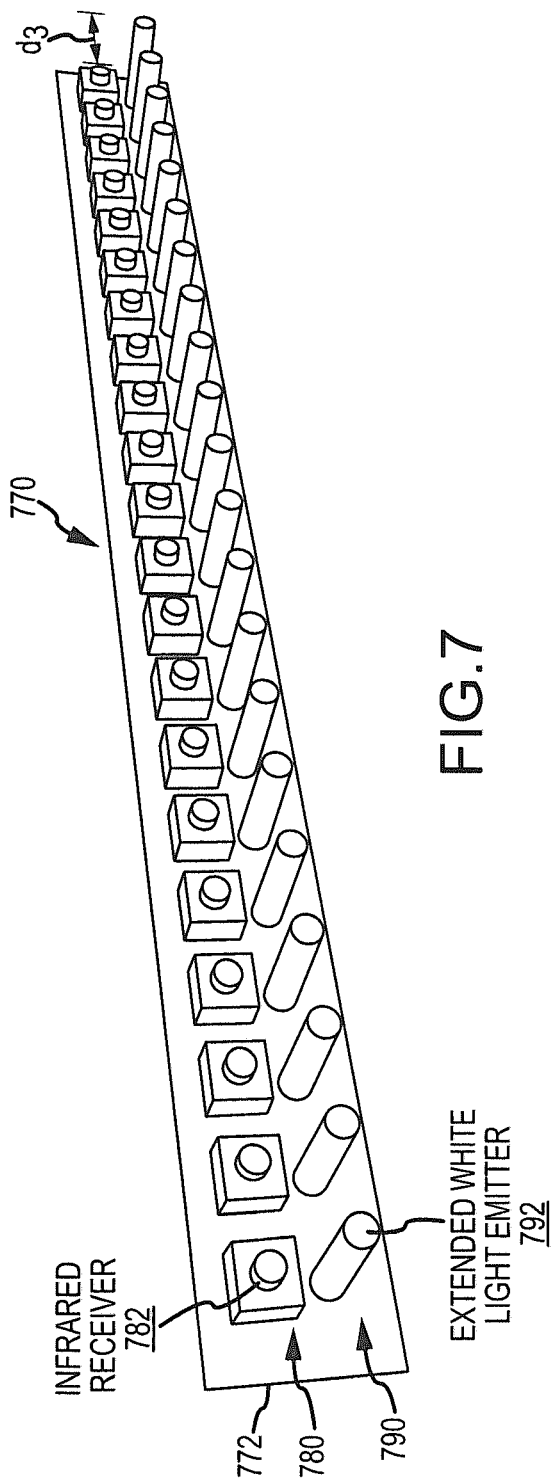
FIG. 7 is a view of a light bar similar to that of FIG. 6 that is modified to place the IR detectors further away from a focusing element such as a Fresnel lens to account for the differing (greater) focal distance of IR relative to visible light used to back light the LC display.

With this differing focal length of the IR and visible light streams in mind, FIG. 7 shows a light bar 770 in which the receiving and emitting surfaces are not coplanar and are spaced apart relative to the base 772. As shown, the light bar 770 includes a base or body 772 on which is mounted a row 780 of infrared receivers 782 and a parallel row 790 of visible light emitters 792 (e.g., white LEDs or the like). The receiving surfaces of the receivers 782 are shown to be closer to the base 772 than the emitting surfaces of the emitters 792 such that any received IR has to travel farther to reach the light bar 770 than light emitted from the emitters 792 to strike a Fresnel or other lens and the LC display. To this end, the plane containing the detecting or receiving surfaces of the IR detectors 782 is an offset distance, $d_3$, from the plane containing the emitting surfaces of the emitters 792, and this offset distance, $d_3$, is determined by calculating the differential focusing distance between infrared and visible light and to suit the relative distance of the viewers/viewing location in the viewing space to the focusing element/LC display but may be in the range of 0.1 to 1 inch in many applications.

As discussed earlier, the operation of a 3D display system can be enhanced by conditioning the light used to back light an LC display so as to better illuminate a viewer's face (and their left and right eyes) with 3D images. More specifically, the components utilized in a light bar to provide visible light may be point sources such as white or other-colored LEDs. If no conditioning is performed, the left or right eye image displayed into the viewing space by these sources may be provided on a relatively small area (with an area of less than a square inch in some cases), which can make it difficult to ensure that a viewer's eye receives the light and its associated left or right eye image.

With this in mind, the inventors recognized that it may be useful to include at least one vertical diffuser to provide spreading of the visible light in the vertical direction and a weak isotropic scatterer to prevent dark areas as the viewer's head, and eyes, move left and right and thus would move into, and out of, areas lit by the point source bright white emitters in conjugate space in a light bar. Additionally, the horizontal diffuser's slight scattering in all directions also evenly distributes visible light so that the point source nature of the white light LEDs does not translate into unevenness in the overall appearance of the image on the LC display. The horizontal diffuser is preferably only placed over the bright light emitters so as not to dull the horizontal detection accuracy of the infrared receivers on the light bar.

The vertical diffuser provides vertical-only expansion of the light ray bundle leaving the LED while not affecting lateral accuracy. Using these two light processing elements, the viewing area for each eye at each seat (or other viewer positioning device) can be made large enough (e.g., 6 to 20 inches vertical) but is preferably kept small enough in width that it does not wash onto the viewer's other eye, e.g., images intended for the left eye do not also strike the right eye, and, hence, more vertical diffusion is typically provided than horizontal and isotropic scattering.

Figure 8:
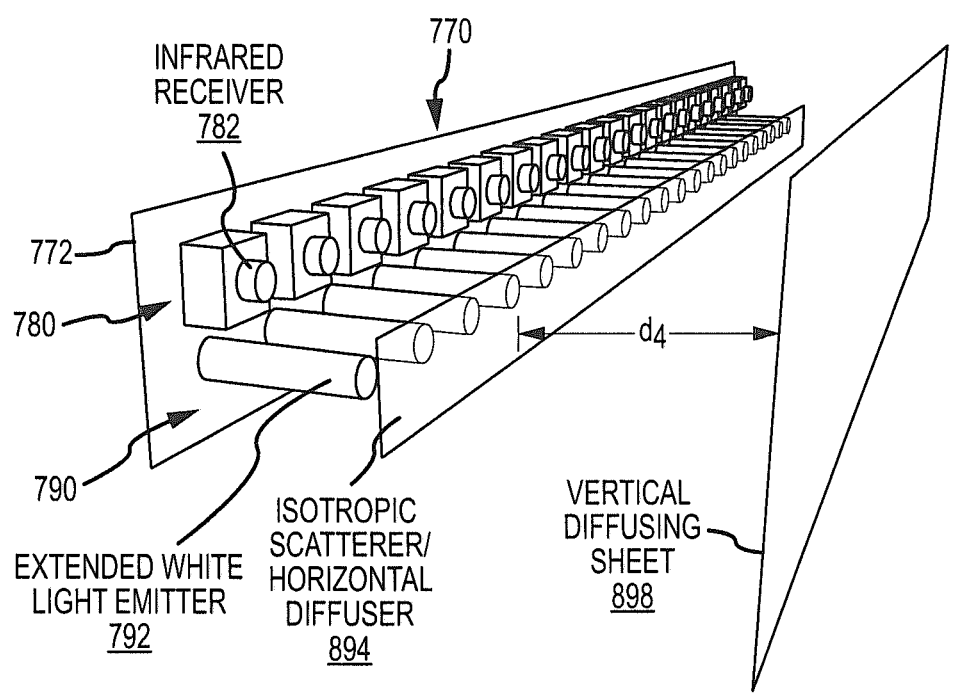
FIG. 8 illustrates a portion of a back light assembly that utilizes offset IR receivers and visible light emitters as well as horizontal and vertical diffusers to condition light used to back light an LC display (or other display element)

FIG. 8 illustrates a portion of a back light assembly using light bar 770 with the IR receivers 782 offset from the light emitters 792. The back light assembly further includes a horizontal diffuser (or isotropic scatterer) 894 that is positioned adjacent the row 790 of light emitters 792. The diffuser 894 may take the form of a narrow rectangle with a length exceeding the length of the row 790 to cover all the emitters 790 and a relatively small width chosen based on the emitters 792 so as to cover the emitters 792 but not cover the IR receivers/detectors 782. Spaced apart a distance, $d_4$, (such as 2 to 8 (or more) inches) from the isotropic scatterer 894 is a vertical diffusing sheet or vertical diffuser 898. Again, the diffuser 898 may take the form of a rectangle with a length chosen based on the length of the row 790 and also on the distance, $d_4$, and vertical diffuser 894 such that all (or most) of the light passing through the horizontal diffuser 894 passes through the vertical diffuser 898 (and then onto the focusing element such as a Fresnel lens). The use of the vertical diffuser 898 allows the height of the viewer to vary and provides some vertical tolerance to a 3D display while the horizontal diffuser provides some horizontal tolerance but also conditions the light to allow a point source such as an LED to act as a back light for a large LC display.

Figure 9:
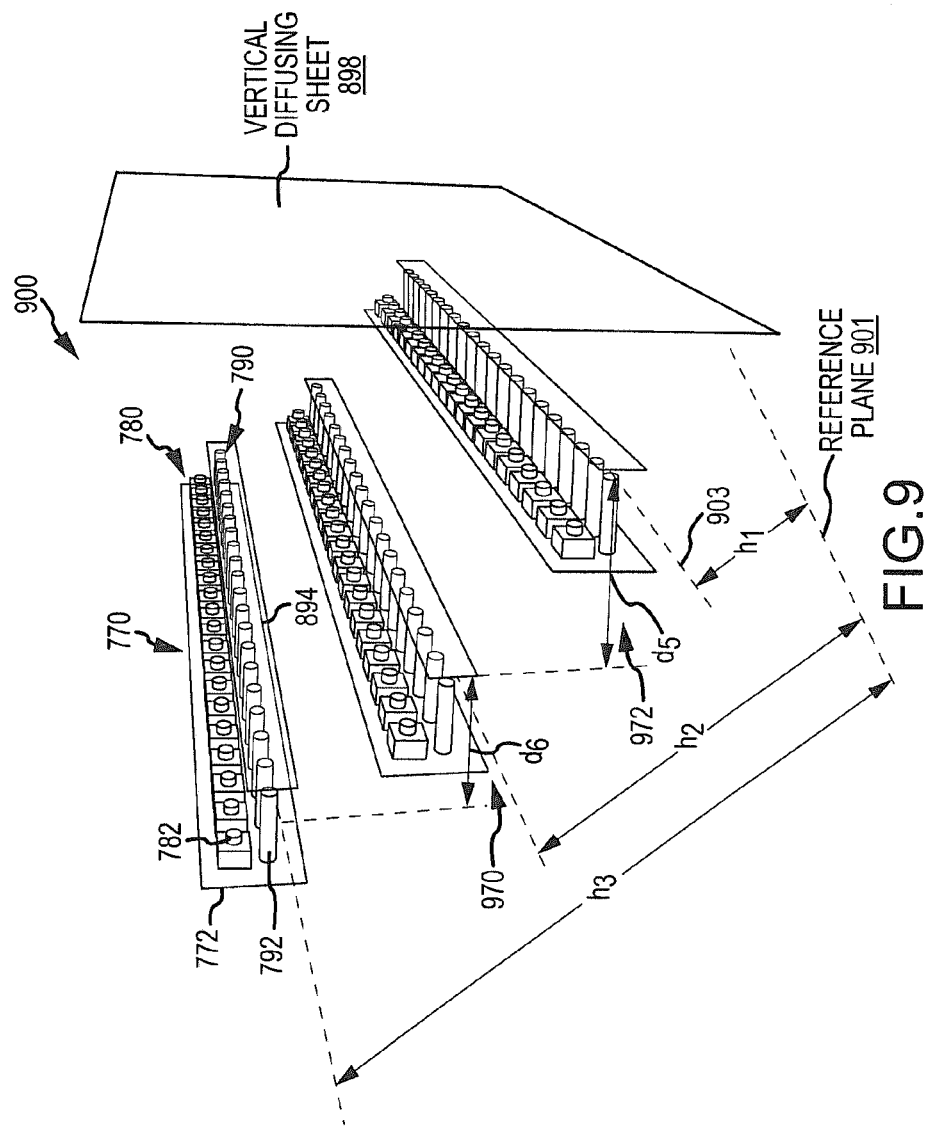
FIG. 9 illustrates a perspective view of a back light assembly using three light bars to serve left and right eye images (stereo images) to viewers/audience members placed in three, tiered rows in a viewing space (e.g., theater, 3D ride vehicle, or the like)

FIG. 8 shows use of one light bar in a back light assembly as may be useful to serve a single row of viewers. More typically, though, the viewing space will be arranged to contain two, three, or more tiered (differing viewing heights and viewing distances) rows as is common in a movie theater or similar 3D viewing application. With this in mind, FIG. 9 illustrates a back light assembly 900 that may be used in a theater or other viewing space with three tiered rows of one to many seats (individual viewing locations).

In the assembly 900, the light bar 770 is provided as a first or upper light bar paired with the horizontal diffuser 894. Further, the assembly 900 includes a similarly configured second or intermediate-height light bar 970 (with a horizontal diffuser such as that shown at 894) and also includes a similarly configured third or lower light bar 972. The lower light bar 972 is used to serve an upper row in a viewing space (as the light is focused in a conjugate manner) and is positioned at a first (lowest) height, $h_1$, relative to a reference plane 901 (as measured to a line passing through the centers of the light emitters (or their outlets)). The intermediate light bar 970 is used to serve a middle or intermediate height row in the viewing space and is positioned at a second (middle) height, $h_2$, relative to the reference plane 901. Further, the upper light bar 770 is used to serve a lower row of viewers in the viewing space and is positioned at a third (highest) height, $h_3$, relative to the reference plane 901.

The heights of the rows 770, 970, and 972 are chosen to suit the amount of tiering (or differences in the row heights) in the viewing space and also based on the configuration of the lens. To cause the reflected and focused IR light to strike the rows of IR receivers (such as detectors 782) on each light bar 770, 970, 972, each row is set at one of three distances from the focusing lens and LC display (not shown in FIG. 9). This is shown with the intermediate row 970 set back a distance, $d_5$, from the front/lower row 972 and the upper or third row set back a distance, $d_6$, from the intermediate or second row 970.

These offset distances, $d_5$ and $d_6$, may be equal and, again, are chosen to suit the viewing distances defined for viewers in the viewing space by the tiered rows of seats. Three horizontal diffusers (such as diffuser 894) are included in the back light assembly 900 to spread the output visible light in the horizontal direction, and, in this embodiment, one vertical diffusing sheet (or diffuser) 898 is used to spread the output visible light from all three of the light bars 770, 970, and 972 in the vertical direction (e.g., to account for varying heights of viewers that may sit in each viewing location in the viewing space (e.g., 3D theater or ride vehicle)).

FIGS. 10A to 10C illustrate three schematic representations of a portion of a light bar showing differing approaches for detecting IR and triggering back lighting of an LC display. Particularly, FIG. 10A shows that for a light bar 1010 each IR receiver 1012 is paired with one visible light emitter 1018. As shown, IR light 1014 strikes the light bar on the IR receiver 1012, which may take the form of an IR phototransistor that is configured to respond to receipt of the IR 1014 by outputting a signal 1013 to a driver circuit 1016. The driver circuit 1016 processes or conditions the signal 1013 to generate a control signal 1017 expected by a visible light emitter 1018, which may take the form of a white light LED, that responds to the signal 1017 to emit visible light onto an LC display (via a focusing element). In this manner, there is substantially no lag between receipt of the reflected and focused IR 1014 and emitting the visible (white or other colored) light 1019.

FIG. 10B shows a light bar 1020 showing a hardware implementation that may be used to drive the light emitter. As shown, an IR receiver 1022 is configured to output a voltage signal upon receipt of IR 1024 to a driver 1026, which triggers operation of a visible light LED 1028 to emit light 1029. One issue with the light bar 1020 is that it may require relatively high levels of incoming IR 1024 to trigger the operation of the LED 1028. So, it may be desirable in some applications to provide a highly sensitive IR detector such that much lower levels of IR are needed to illuminate viewers' faces in the viewing space to trigger back lighting by visible light emitters.

To this end, FIG. 10C shows a light bar 1030 in which an IR receiver 1032 is used to receive and provide an output signal to driver 1036. The IR receiver 1032 is configured to receive IR that is modulated to a particular frequency or range of frequencies. For example, many televisions utilize IR receivers that are adapted for detecting 38 kHz modulated IR, and, since this is a standard, much work in the television industry has been performed to make such IR receivers very sensitive to relatively low amounts of IR (such as from a remote for a television). Hence, the light bar 1030 may use an IR receiver 1032 in the form of a conventional 38 kHz IR receiver (such as the Model TSSP4038 from Vishay Inc.), and the levels of IR 1034 required to trigger operation of the driver 1036 are reduced. When even small amounts of IR 1034 are received, the receiver 1032 sends a control voltage/signal to the driver 1036, which responds by triggering operation of the white or other-colored LED 1038 to emit light 1039 to a focusing element and an LC display.

A low pass filter (not shown) may be placed between the receiver 1032 and drive transistor 1036 with a cut off frequency sufficient to pass the left-right frame transition frequency but not the 38 kHz signal to the white light emitter thus preventing any possibility of feedback of 38 kHz white light to infrared receiver 1032. Although this path is highly attenuated, it can cause local oscillations due to the proximity of the IR receivers 1032 and white light emitters 1039.

Each of the circuits described in FIG. 10 provide substantially miniscule amounts of delay between the times that IR energy is reflected from a viewer's face and the times bright illuminating imagery from the LC screen is returned to their face so that the system effectively performs instantaneous head tracking.

Figure 11:
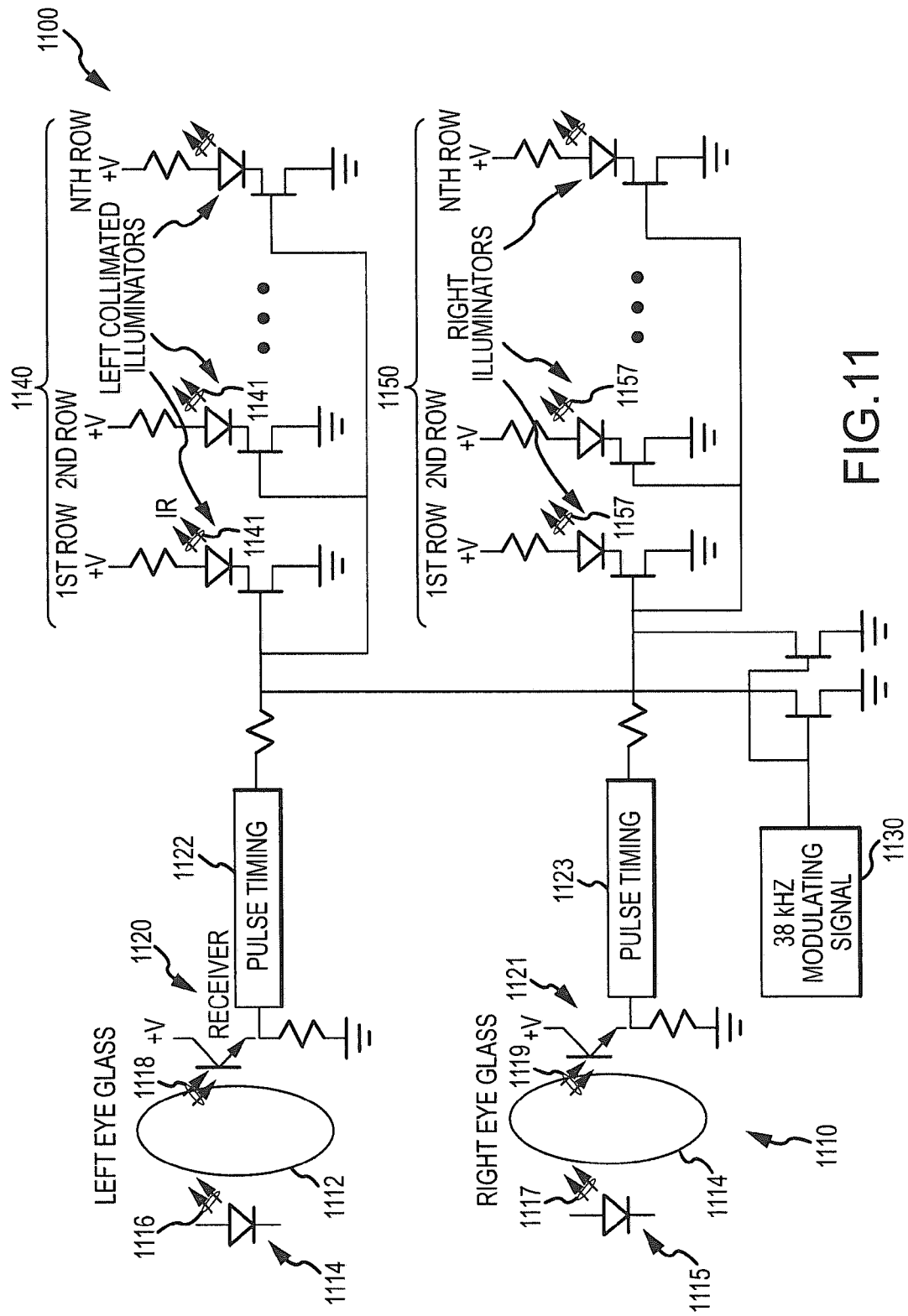
FIG. 11 is a schematic or functional block drawing of a portion of a 3D display system showing a sync signal generator for use in controlling operation of left and right collimated illuminators in a manner that is time synchronized with an LC display to display left and right eye images.

As discussed above, a 3D display system is operated such that the left portion of a viewer's face is illuminated with IR while a left eye image is displayed and such that the right portion of the viewer's face is illuminated with IR while a right eye image is displayed. With this in mind, it is desirable that the 3D display system include one or more devices for providing time synchronization between the LC display (or other display element) and the illuminators. FIG. 11 illustrates a 3D display system 1100 (or a portion of one) that uses the synchronized operation of shutter glasses to control the illuminators. Briefly, a 3D television may operate by synchronizing the opening and closing of a pair of shuttered lens in a viewer's glasses with display of left and right eye image, and this controlled shuttering likewise be used to control selective illumination of the viewer's left and right eyes (or the sides of their face).

To this end, the system 1100 includes rows of left collimated illuminators 1140 for generating IR 1141 to illuminate the left sides of viewers' faces with the viewers in tiered rows and further includes right collimated illuminators 1150 for generating IR 1151 to illuminate the right sides of viewers' faces. A sync generator 1110 is provided that includes a white light emitter (LED or the like) 1114 directed at a left eye glass 1112 and a white light emitter (LED or the like) 1115 directed at a right eye glass 1113.

The emitters 1114 and 1115 operate on an ongoing basis to emit light 1116 and 1117, but the left eye glass 1112 and the right eye glass 1113 are shuttered (not shown) such that one of the two glasses 1112, 1113 is open at any particular time. More specifically, the left eye glass 1112 has its shutter opened when a left eye image is being displayed on an LC display and the right eye glass 1113 has its shutter opened when a right eye image is being displayed (and each is closed when the other eye image is being displayed). The control over the glasses 1112, 1113 can be provided by a conventional shuttered glasses 3D television system (and may be used as display controller 120 and/or system controller 130 of system 100 in FIG. 1).

When a shutter is open, light 1118 or 1119 passes through a lens/glass 1112, 1113 to strike a light detector 1120, 1121. The detectors 1120, 1121 respond by triggering operation of a pulse timing device 1122, 1123 to provide a control signal to the left collimated illuminators 1140 to illuminate the left sides of viewers' faces or to the right collimated illuminators 1150 to illuminate the right sides of viewers' faces. In this way, each viewer has the left side of their face (and left eye) illuminated when the left eye glass 1112 is open and has the right side of their face (and right eye) illuminated when the right eye glass 1113 is open. This acts to synchronize in time the display of left eye images on a display with reflection of IR off of a viewer's left side and the display of right eye images on a display with reflection of IR off of a viewer's right side.

The 3D display system 1100 further includes a signal modulator 1130 linked to the left and right collimated illuminators 1140, 1150. As discussed above, the use of a particular modulated frequency can be used to provide much more sensitive IR receivers. A present standard for an IR receiver is 38 kHz, and the modulator 1130 may function to cause the IR 1141, 1151 provided by the illuminators 1140, 1150 to be modulated at 38 kHz to match the IR receivers of one or more light bars in a back lighting assembly (not shown in FIG. 11).

To this point in the description, 3D display systems have been discussed that use IR detectors paired with LEDs or other point sources of light or that use a particular lens or display element. However, it will be apparent to one skilled in the arts that once the general concepts for 3D display systems taught herein are understood that a wide variety of components may be used to create a 3D display system that functions to provide a 3D experience to a viewer without the need for special glasses or headgear. With this in mind, the following discussion describes a number of 3D display systems that may use some of the components discussed above (and for which like numbering is used and which are not discussed again in detail such as illuminators 240, 241) but that replace one or more devices to create unique 3D displays.

Figure 12:
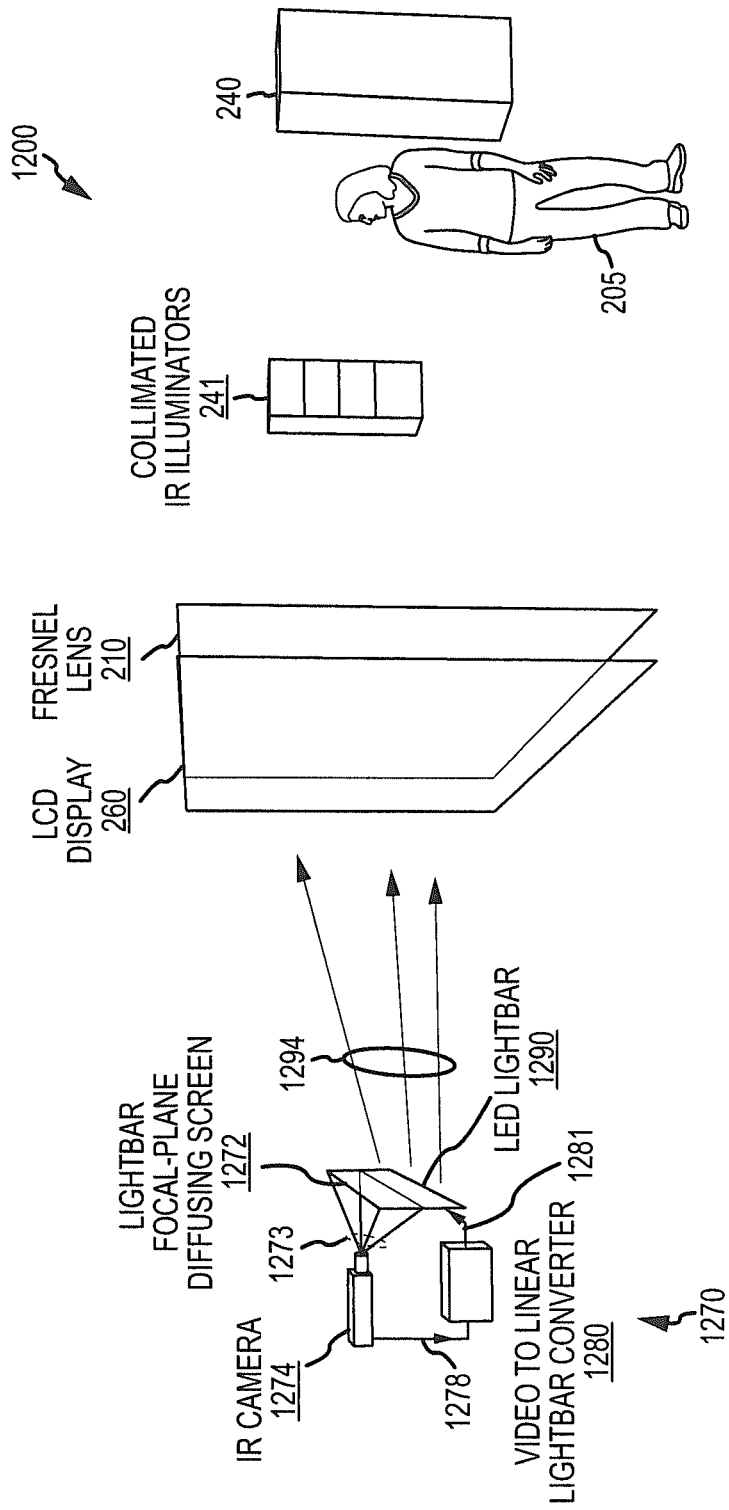
FIG. 12 is a functional diagram of another implementation of a 3D display system making use of a video light bar to serve as a back light.

FIG. 12 illustrates a 3D display system 1200 similar to system 200 of FIG. 2 that is adapted with a different back light assembly 1270. Particularly, the assembly 1270 includes an IR camera 1274 that functions to receive IR light 1273 that is focused by the Fresnel lens 260 onto a diffusing screen 1272. The assembly 1270 further includes a video-to-linear light bar converter 1280 that processes the output signal/data from the IR camera 1274 to provide control signals 1281 to operate LEDs or other light sources arranged in a linear row on a light bar 1290. The light bar 1290 responds by emitting visible light 1294 that is focused by lens 260 through LC display 210 to viewers 205 positioned between collimators 240, 241. In this manner, individual IR receivers are not required for each visible light source and "IR detector/receiver" can be understood more broadly to include any device capable of detecting IR and "driver" can be any device used to trigger operation of particular ones of the LED/sources of a light bar (such as light bar 1290).

Figure 13:
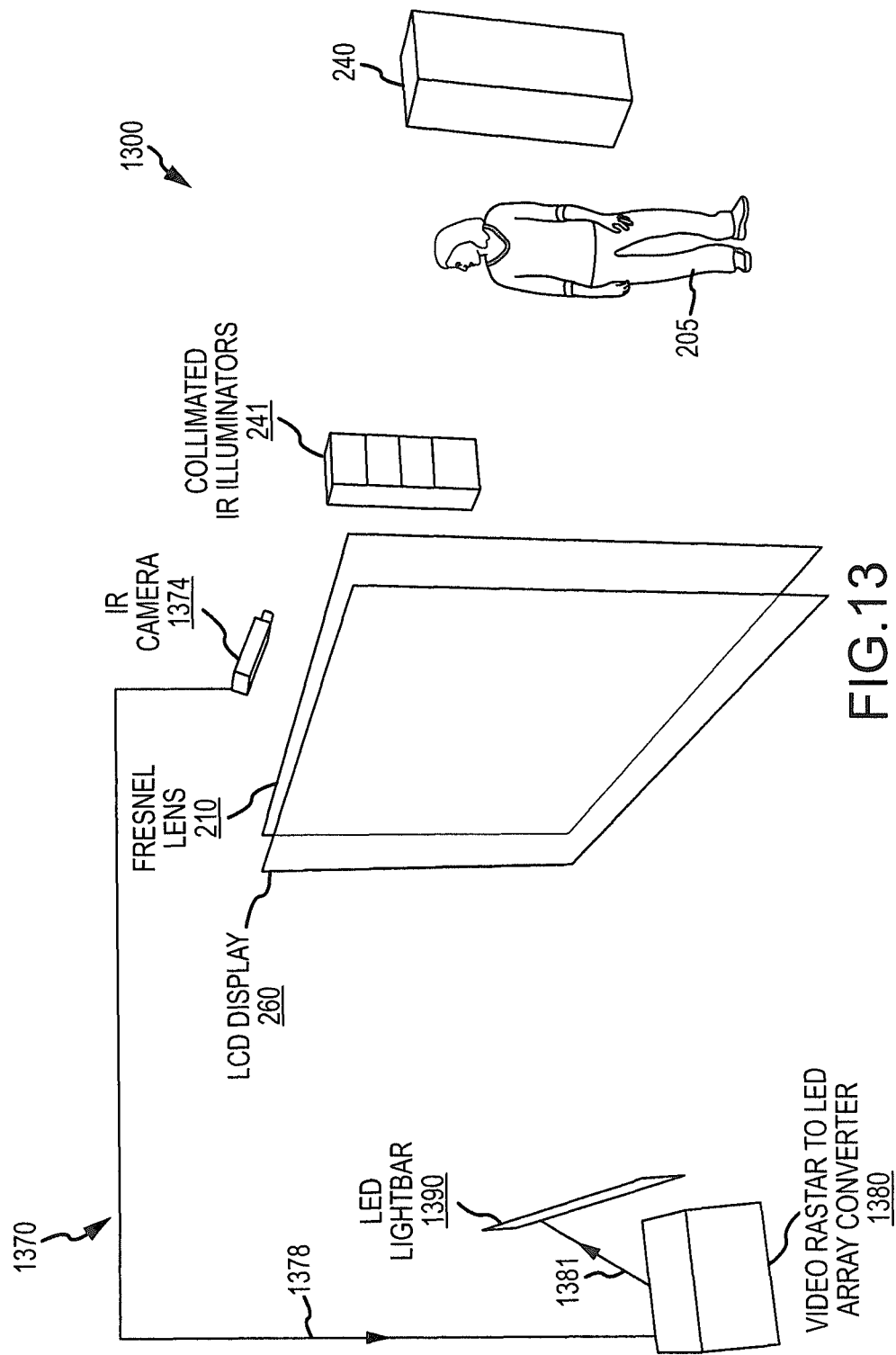
FIG. 13 is a diagram of an implementation of a 3D display system using an out-front camera to provide IR tracking that can be used to selectively drive operation of visible light sources arranged in an array (horizontal rows of white LEDs or the like stacked and/or tiered)

FIG. 13 illustrates a 3D display system 1300 similar to system 200 of FIG. 2 and system 1200 of FIG. 12 using a different back light assembly 1370. In the back light assembly 1370, an IR camera 1374 is provided adjacent and/or in front of the LC display 210 (or in the viewing space). The IR camera 1374 provides a signal/data 1378 that provides live tracking of IR light in the viewing space in front of the LC display 210 such as IR being reflected from the left and right sides of the face of the viewer 205. A converter 1380 is provided in the back light assembly 1370 that functions to generate an LED array control signal 1381 based on the video signal 1378 or to provide video raster-to-LED array conversion to selectively operate the LEDs in a LED light bar 1390 to illuminate the LC display 210 via lens 260. The light bar 1390 may include one or more rows of LEDs that can be independently operated by converter 1380 with signal 1381 to direct IR light through the display 210 onto a left or right side of a face of a viewer 205 positioned between illuminators 240, 241.

Figure 14:
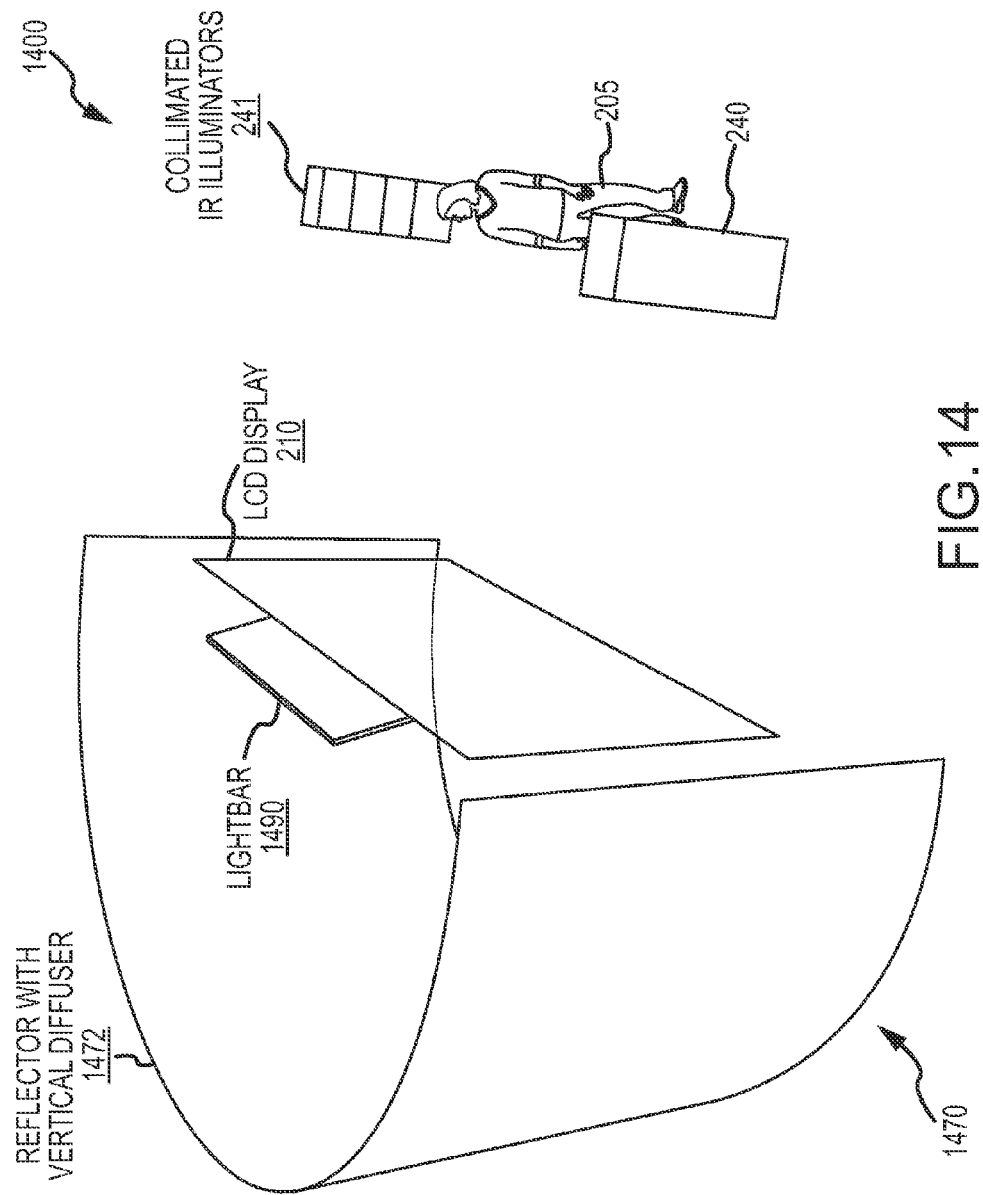
FIGS. 14 and 14A are diagrams of a 3D display system making use of a curved or cylindrical reflector in a back light assembly to provide optical paths for focused IR light and emitted visible light to back light a display element.

FIG. 14 illustrates a 3D display system 1400 similar to that of system 200 of FIG. 2 in which a different back light assembly 1470 is used to back light the LC display 210. As shown, a cylindrical or curved reflector 1472 is placed behind the LC display 210 (opposite the viewing space where illuminators 240, 241 are placed). The reflector 1472 may include a vertical diffuser spaced apart or on the reflector's receiving/reflecting surface. IR light is provided by the illuminators 240, 241 and reflects off the left and right sides of the face of viewer 205. This light travels through the IR-transparent display 210 and is horizontally focused and vertically reflected by the cylindrical reflector 1472.

The reflector 1472 along with the vertical diffuser reflects and focuses slightly vertically-diffused IR light to strike the light bar 1490, which may be configured as shown in FIG. 6 or 7 with an IR receiver paired with a visible light emitter. Hence, the IR light causes the light bar 1490, which is facing away from the LC display 210 towards the reflector 1472, to emit visible light from point sources. This visible light reaches the reflector 1472 and is reflected (horizontally focused and slightly vertically diffused) back through the LC display (to provide back lighting while left or right images are displayed) and onto the viewer 205. As with the other 3D displays, in the system 1400, the light bar 1490 acts to provide light for back lighting the LC display 210 for each eye of each viewer 205 as the light returns along the path defined by the reflected IR light from the left and right sides of the face of viewer 205 originating with illuminators 240, 241.

Figure 14A:
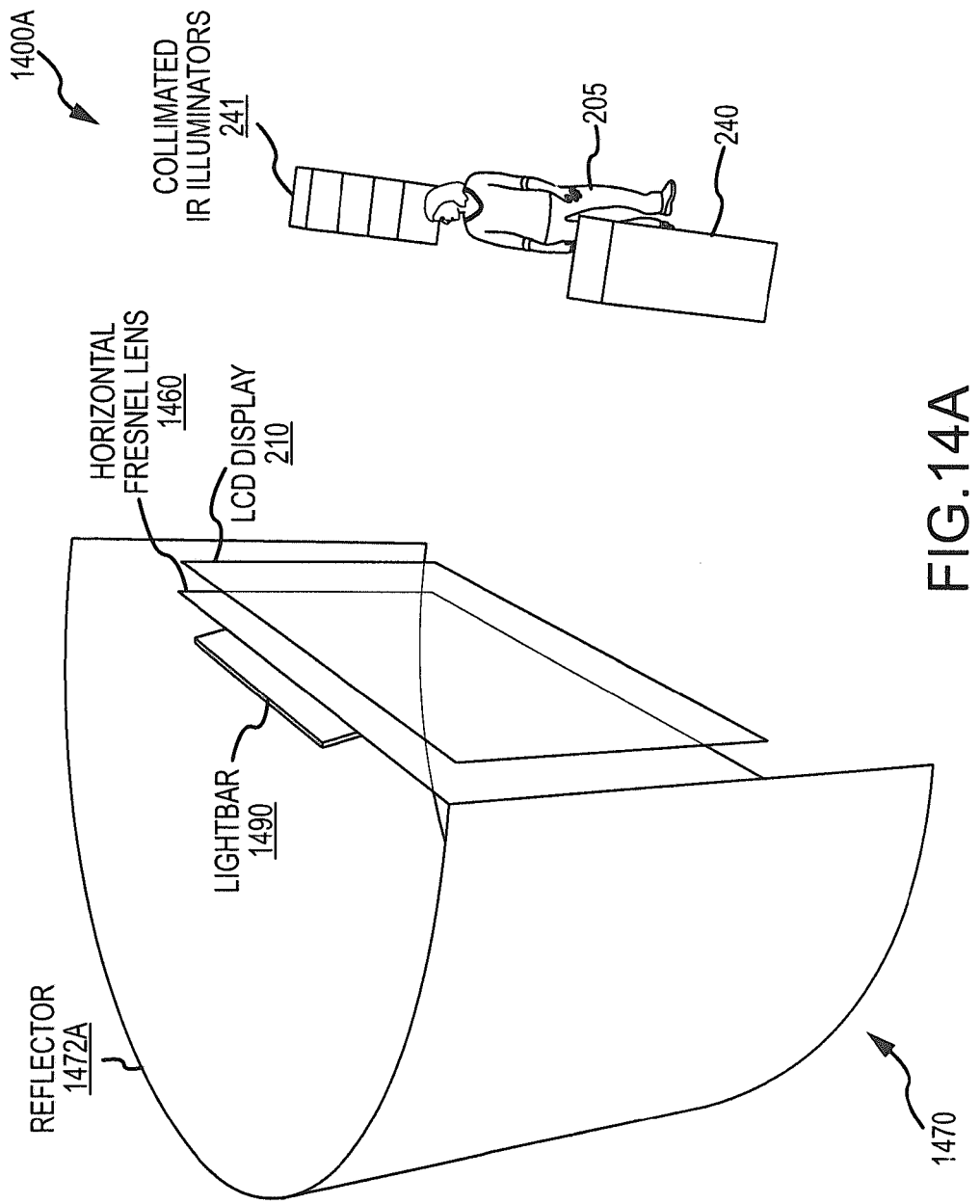

FIG. 14A illustrates a 3D display system 1400A similar to the system 1400 of FIG. 14. However, in system 1400A, a horizontal, cylindrical Fresnel lens 1460 is used and is mounted adjacent to the LC display 210. The horizontal focus is provided by the cylindrical reflector 1472A (shown without a vertical diffuser), while vertical focusing (which may be somewhat weaker power) in the system 1400A is provided by the horizontal linear Fresnel lens 1460.

FIG. 15 shows a 3D display system 1500 similar to system 200 of FIG. 2 and system 1400 of FIG. 14 but with a modified or different back light assembly 1500. As shown, the back light assembly 1570 includes a light bar (one to many rows of pairs of IR receivers and visible light emitters) 1590 that faces away from the LC display 210. IR light from the illuminators 240, 241 is reflected off of the sides of the face of viewer 205 passes through the LC display 210 and is focused by the reflector 1570 with vertical diffuser toward light bar 1590.

Spherical reflector 1572 is spaced apart a focal distance from the LC 210. This distance is chosen such that the focused IR light is reflected onto IR receivers of the light bar 1590 and also such that light emitted by emitters of the light bar 1590 striking the reflector 1572 returns on the same/similar path through the LC display 210 and out to the left or right eye of the viewer 205. The reflector 1572 may be covered with a vertical diffuser (or one may be positioned between the reflector 1572 and LC display 210) to spread the reflected visible light vertically prior to it being delivered to the viewer 205.

In an alternate embodiment, the switching between left and right eye images for viewers may be achieved through the use of polarized light and switching between vertical and horizontal polarization of light used to back light an LC display. For example, FIG. 16 illustrates a 3D display system 1600 similar to that of system 200 in FIG. 2 but with a polarization-based back light assembly 1670. The back light assembly 1670 includes a light bar 1690 that selectively provides visible light (e.g., white light) in response to the IR from the illuminators 240, 241 striking the viewer 205 and reflecting through the LC display 210 and being focused by the Fresnel lens 260. The back light assembly 1670 (or display assembly including LC display 210) includes a patterned polarizer 1672 and a screen-sized polarization rotator 1674 sandwiched between the display 210 and the Fresnel lens 260.

The illuminators 240, 241 are synchronized to operate with the polarization rotator 1674 such that the left illuminator 240 operates when the rotator 1674 is operated to polarize the light from light bar 1690 to show left eye images with display 210 and further such that the right illuminator 241 operates when the rotator 1674 is operated to polarize the light from the light bar 1690 to show right eye images with display 210. For example, a sync signal 1675 is provided to the polarization rotator 1674 to switch between vertical and horizontal polarization of the light from light bar 1690 to show first left and then right eye images with display 210, and the left and right collimators 240, 241 will be synchronized to operate with the rotator 1674 to illuminate the left and right sides of the face of the viewer 205 (and other viewers in the viewing space) with display of the left and right images.

Figure 17:
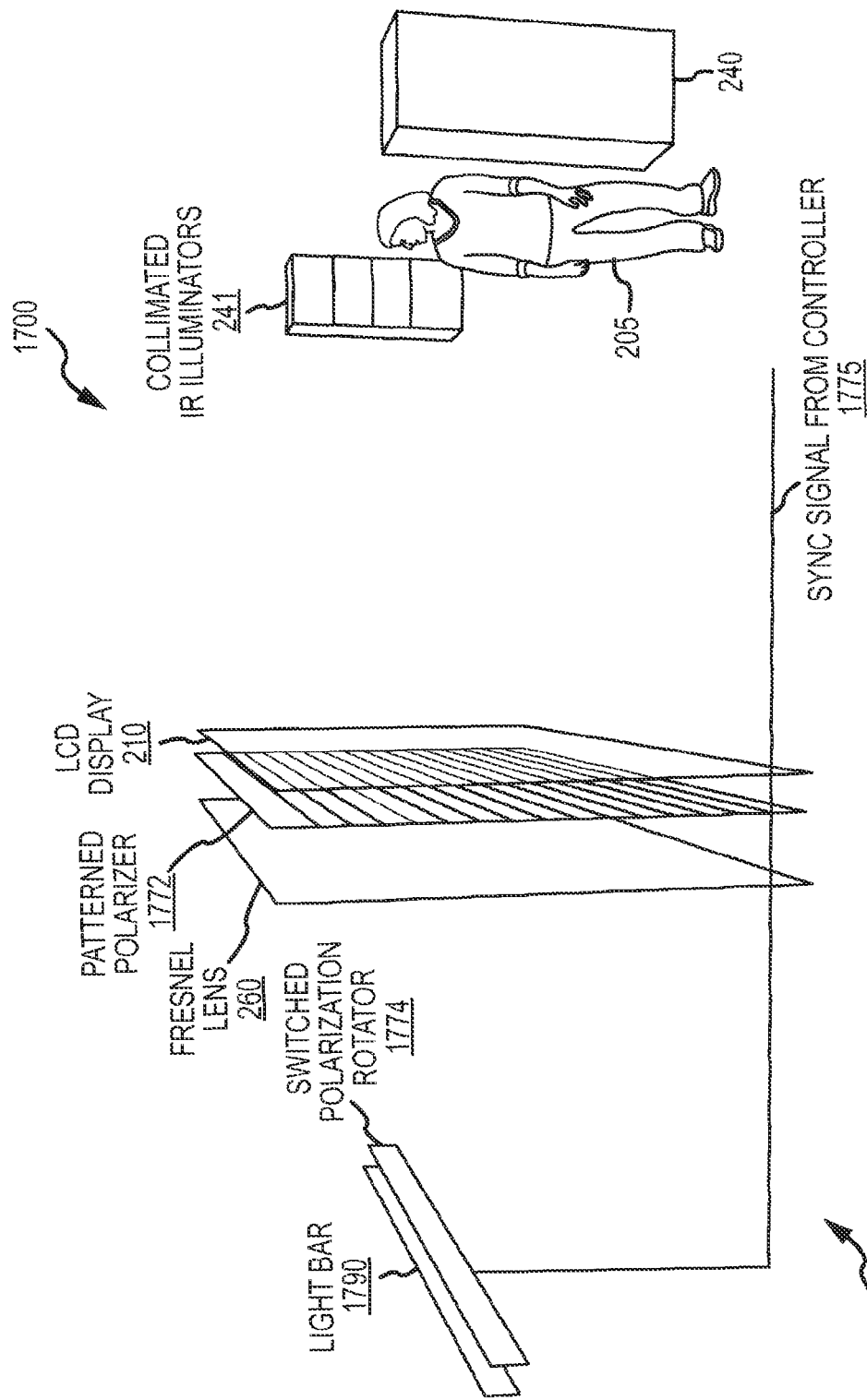
FIG. 17 illustrates a 3D display system similar to that of FIG. 16 but with a differing location of the polarization rotator.

In FIG. 17, a 3D display system 1700 is shown that is similar to the system 1600 of FIG. 16 but with a somewhat different arrangement in the back light assembly 1770. Particularly, a patterned polarizer 1772 is placed between the LC display 210 and the lens 260. However, the switched polarization rotator 1774 is placed between the lens 260 and a light bar (or bars) 1790. Typically, the rotator 1774 will be placed proximate (such as several inches or less from) the light bar 1790 such that its size can be minimized while still conditioning the emitted white (or other colored) light from the light bar 1790. As with the system 1600, the operation of the rotator 1774 is synchronized using a sync signal 1775 from a controller, and a similar signal would be used to operate the left and right illuminators 240, 241 (left illumination with IR concurrently with polarization to show left eye images and vice versa).

FIG. 18 shows another 3D display system 1800 in which the right collimated IR illuminators 241 are operated 1843 to provide IR with a first digital code while the right collimated IR illuminators 240 are operated 1842 to provide IR with a second digital code. In the system 1800, the back light assembly 1870 again includes a patterned polarizer 1872 sandwiched between the LC display 210 and the Fresnel lens 260 and a switch polarizer 1874 placed near the light bar 1890. However, the system 1800 differs in that the back light assembly 1870 includes an IR digital code receiver 1873 that operates to switch operation of the switched polarizer 1874 to synchronize its operation with operation of the two illuminators 1842, 1843 (e.g., to polarize the output of light bar 1890 to display a left eye image with LC display 210 when the left illuminators 240 are operated as determined by receipt of IR with the second digital code 1842 rather than the first digital code).

Figure 19:
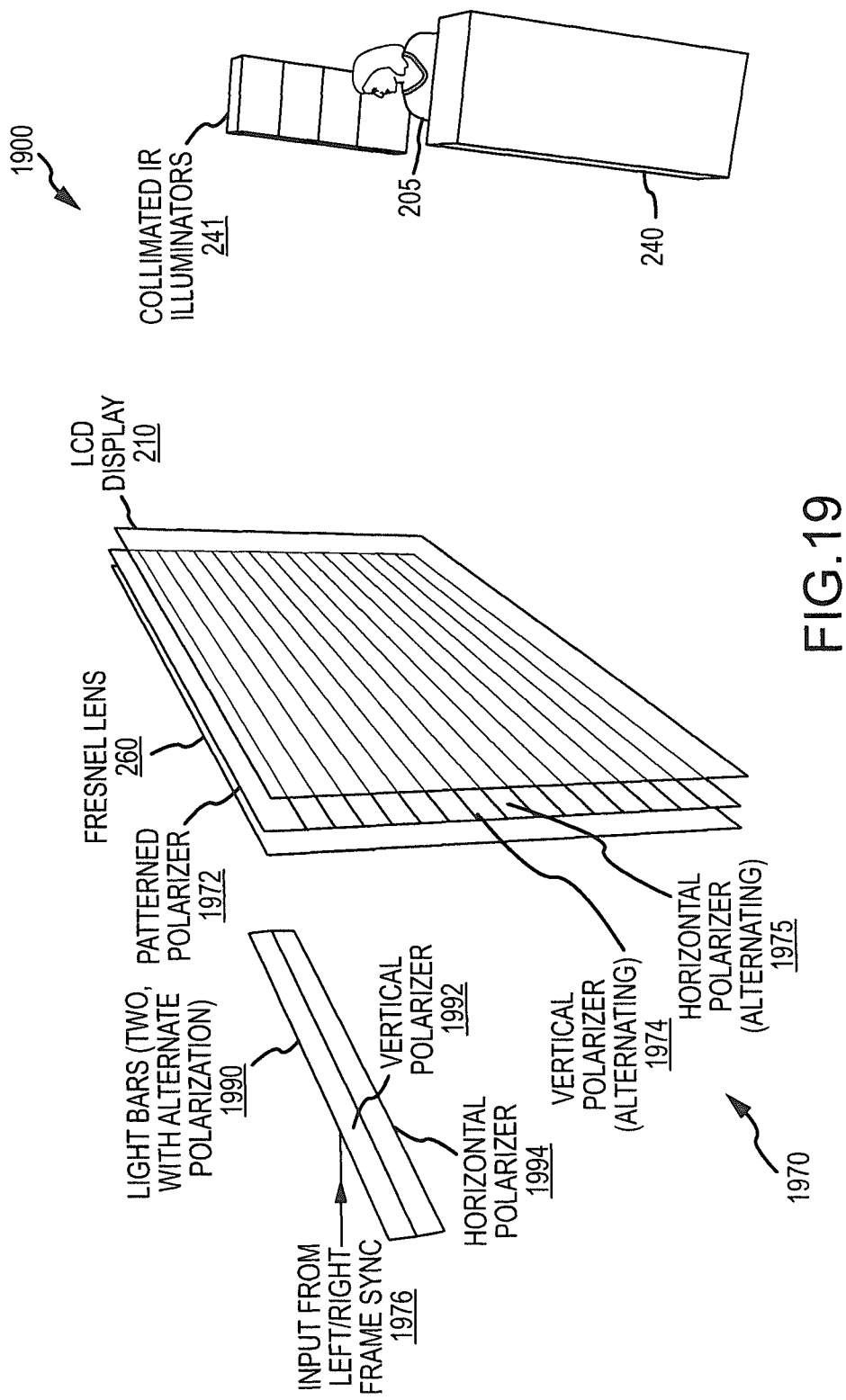
FIG. 19 shows a 3D display system using a pair of light bars per row of viewers that are used in a switched manner to show left and right frames of a 3D video stream.

In FIG. 19, a 3D display system 1900 is shown that includes a back light assembly 1970 that again calls for a patterned polarizer 1972 to be placed between the LC display 210 and the focusing element 260. In this case, a polarization rotator is not used but, instead, a pair 1990 of light bars is used for each row of illuminators 240, 241 and viewers 205, and one has its output light polarized with a vertical polarizer 1992 and one with a horizontal polarizer 1994. An input or control signal 1976 is used to switch between use of the two light bars 1990 such that the back lighting provided switches between vertical and horizontal polarization (or left and right frame display) as shown with the patterned polarizer 1972 alternating between acting as a vertical polarizer (as shown at 1974) and a horizontal polarizer (as shown at 1975). A similar control signal is used to switch between operation of the two illuminators 240, 241 such that one is operated concurrently with one of the light bars 1990 so as to switch between presenting left and right eye images to the left and right eyes of each viewer 240, 241.

Figure 20:
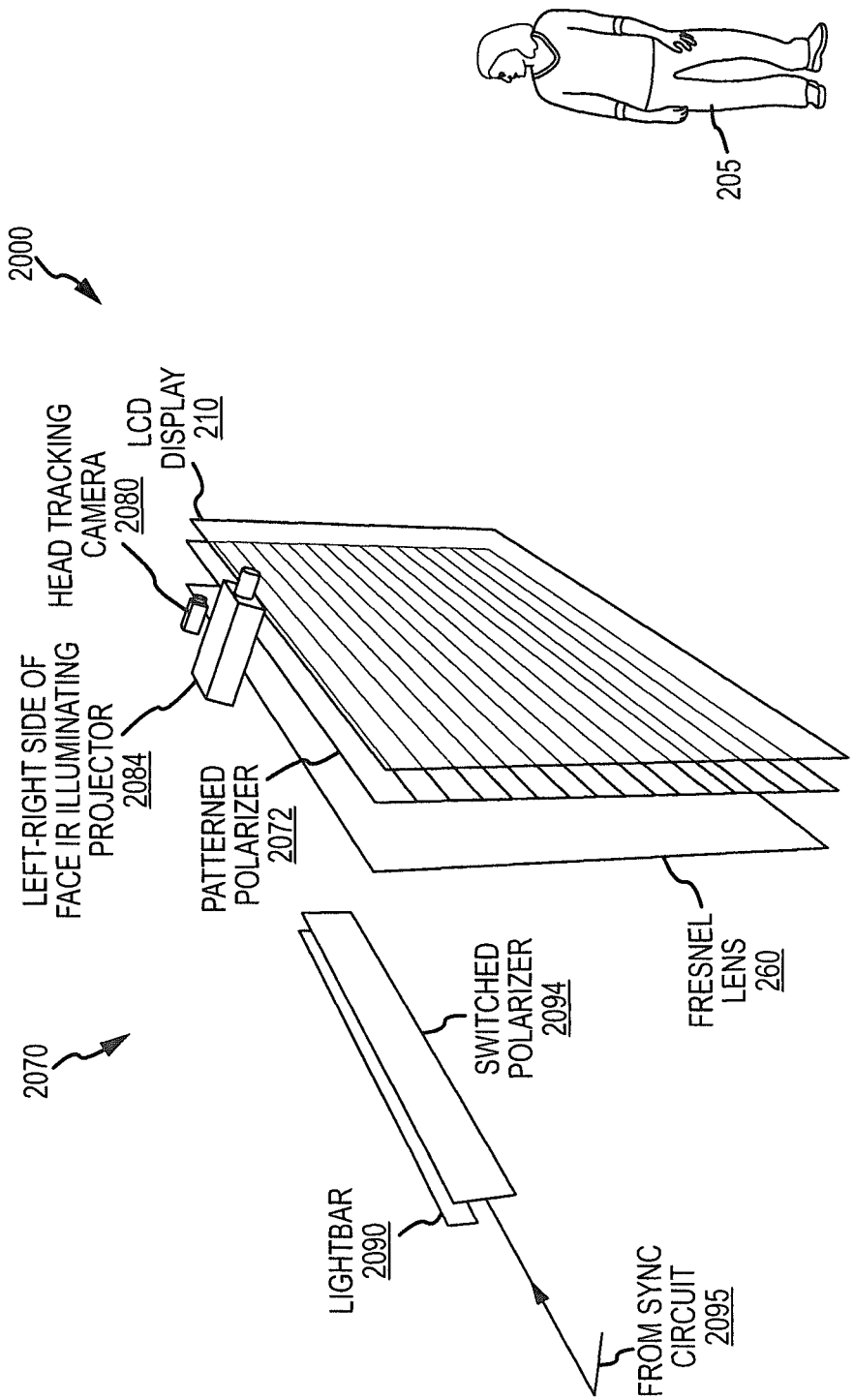
FIG. 20 illustrates another 3D display system similar to the system of FIG. 19 that further makes use of a head tracking camera.

FIG. 20 illustrates a 3D display system 2000 similar to that of the system of FIG. 17 but using a different arrangement for selectively illuminating each viewer's face. As with system 1700, the back light assembly 2070 includes a patterned polarizer 2072 between the LC display 210 and the Fresnel lens 260 and further includes a switched polarizer 2094 paired with a light bar 2090 (with the operation of the switched polarizer 2094 controlled by a signal 2095 from a controller or sync circuit).

To provide synchronized IR illumination, the 3D display system 2000 includes a head tracking camera 2080 that is used to determine the location of each face/head of the visitors 205 in the viewing space. in this manner, the left and the right sides of all the faces are determined by the tracking camera 2080, and, in response, a processor and/or software is used to provide a controlling signal to a left-right side of face IR illuminating projector 2084 to cause the projector to switch between projecting IR just on the left sides of the faces of the viewers 205 and on the right sides of the faces of the viewers 205. This left-right-left-right and IR illumination by projector 2080 is synchronized in time with operation of the switched polarizer 2094 with signal 2095 from a sync circuit or system controller.

Figure 21:
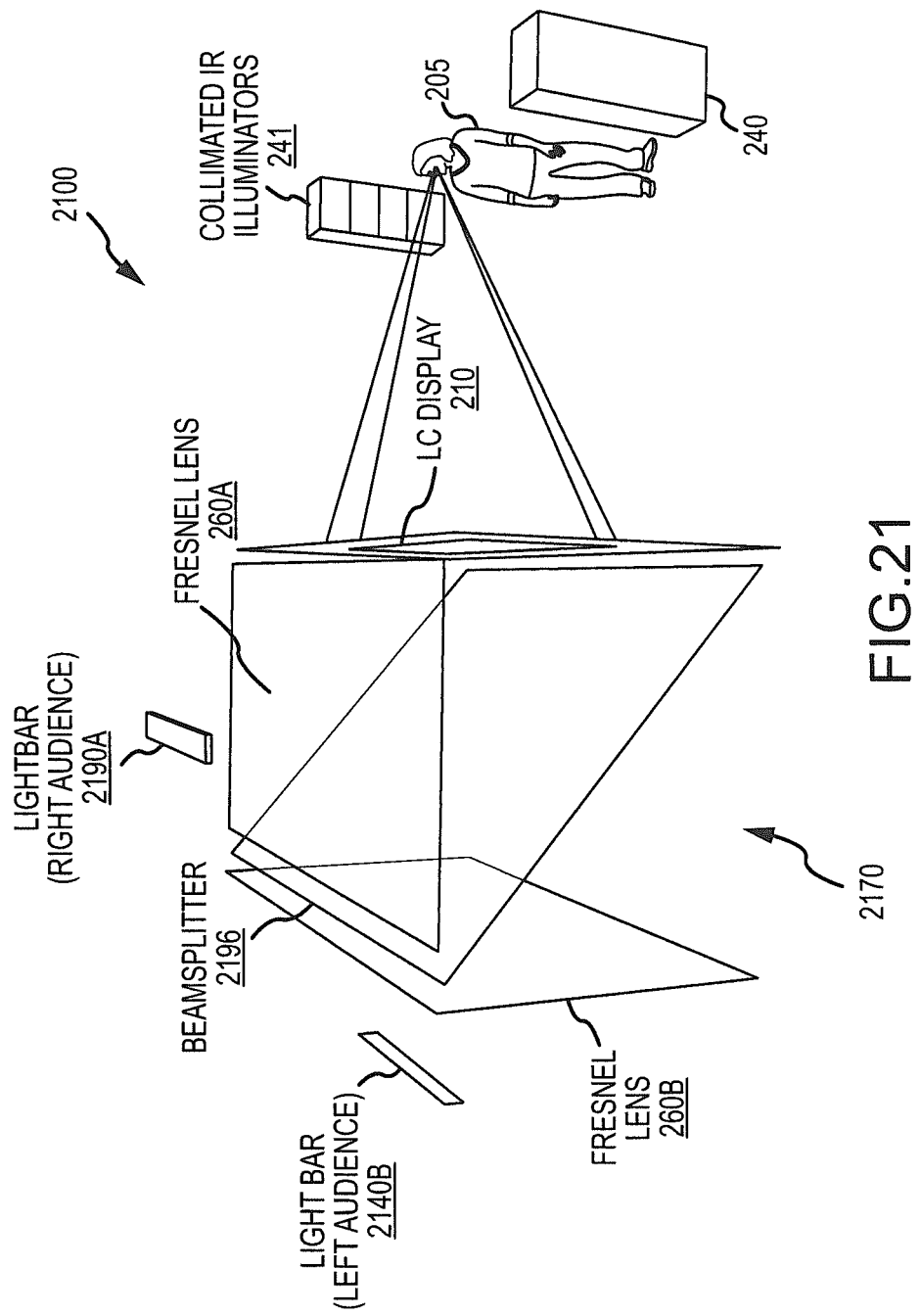
FIG. 21 shows a 3D display system making use of a beam splitter combined with a pair of focusing elements to provide a 3D experience to viewers without the need for shuttered or other 3D glasses or headgear.

In some of the above embodiments, a single Fresnel lens is used, but this may be undesirable in some applications as this may limit the viewing angle (or width of the viewing space) that can be served by the display system. To relieve the Fresnel narrow angle, 3D display system 2100 shown in FIG. 21 includes an LC display 210 and a pair of orthogonally-arranged (or at least transversely arranged) Fresnel lenses 260A and 260B spaced apart from the back of the LC display 210. A beam splitter 2196 is provided between the two Fresnel lenses 260A and 260B to split the received IR light from the LC display 210 (originating from illuminators 240, 241 and being reflected from the left and right sides of the face of viewers 205 in the viewing space) and direct it to the two lenses 260A and 260B.

A light bar 2190A is provided behind the first Fresnel lens 260A to detect IR light from the right side of the audience and to back light the LC display via beam splitter 2196 for the right side of the audience of viewers 205. Similarly, a second light bar 2190B is provided behind the second Fresnel lens 260B to detect IR light from the faces of the viewers 205 in the left side of the audience and back light the LC display 210 for this portion of the audience.

Figure 22:
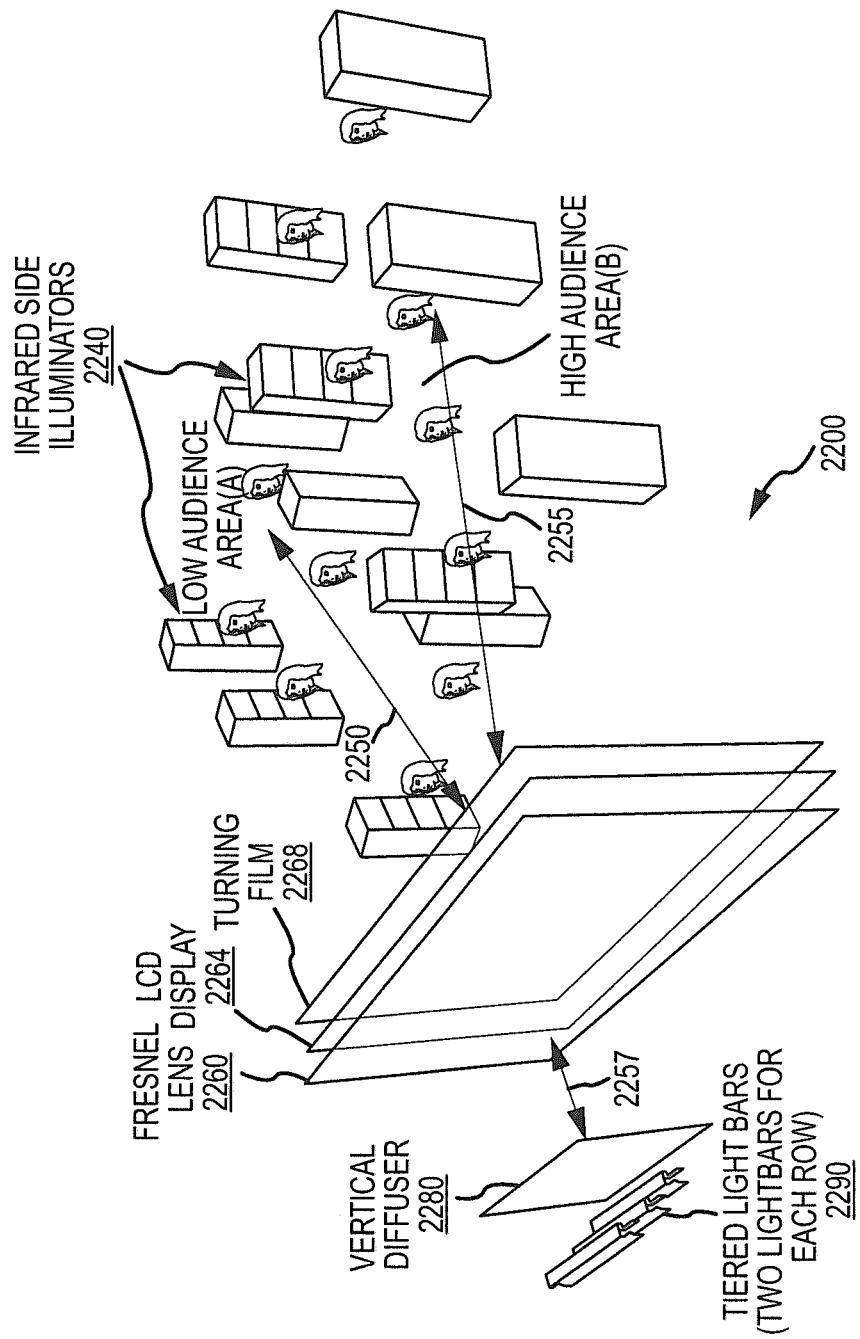
FIG. 22 illustrates a system using a turning film mounted in front of an LC display to provide 3D images without glasses to a wider swath of viewers.

FIG. 22 illustrates, with display system 2200, an alternate method to widen the angle at which audience members can view 3D without glasses. The system 2200 uses a single Fresnel lens 2260 but with a sheet of optical turning film 2268 applied to the surface of the LC display 2264 closest to the audience. Turning films that may be used for film 2268 (such as 90 degree turning film from the 3M Company, Vikuiti product line) include an array of linear microprisms, which collectively cause light entering one plane surface of the material to be split into two paths divergent by 90 degrees. This film 2268 is mounted such that its splitting axis runs vertically, causing light be split to be split along a vertical axis so that it can serve two audience sections "A" and "B."

As in earlier embodiments, each section has its members simultaneously lit on the left and right sides of their faces by illuminators 2240. The light 2250, 2255 from each of the sections A and B is merged by the turning film and is focused by the Fresnel lens 2260 towards the light bars 2290 (as shown with arrow 2257) via vertical diffuser 2280. In order to provide tracking for the two sections of the audience without interference between them, the audience seating in a first section (A) is lower than in a second section (B). There are two sets of light bars 2290 for each row of seats: a light bar for the upper $1^{st}$ row; one for the lower first row; a light bar for the upper second row; one for the lower second row; and so on. Interference between rows and individual viewers is prevented by the conjugate optics nature of the system 2200.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A display apparatus, comprising: a display element;
a display controller first displaying a left eye image and second displaying a right eye image on the display element;
in a viewing space adjacent a display surface of the display element, an illuminator assembly operable to provide infrared (IR) light in the viewing space; and
a back light assembly generating visible light to back light the display element only in response to reflection of portions of the IR light from one or more viewers positioned at viewing locations in the viewing space,
wherein the display element is transparent to the reflected portions of the IR light, whereby the reflected portions of the IR light passes through the display element prior to the reflected portions striking the back light assembly to trigger the generating of the visible light to back light the display element,
wherein the back light assembly includes a light bar comprising a row of IR receivers detecting the reflected portions of the IR light and a row of visible light sources each independently and selectively operating only when a paired one of the IR receivers detects the reflected portions of the IR light to provide the visible light to back light the display element, and
wherein the viewing space includes a number of tiered rows of individual seats for defining the viewing locations for the viewers and wherein the back light assembly comprises the number of the rows of the IR receivers and the visible light emitters arranged in tiers.

2. The display apparatus of claim 1, wherein the display element comprises a liquid crystal (LC) display that is transparent to the reflected portions of the IR light.

3. The display apparatus of claim 1, wherein the light bar is curved to follow the Petzval focusing surface of a focusing element positioned between the LC display and the light bar.

4. The display apparatus of claim 1, wherein a vertical diffuser is applied adjacent to the light bar to vertically shape light emitted from the light bar prior to the emitted light back lighting the display element whereby the emitted light provides a taller head box at the viewing locations.

5. The display apparatus of claim 1, wherein an isotropic scatterer is positioned adjacent the visible light sources, whereby light output by the light sources is evened out and whereby gaps between the visible light sources are filled.

6. The display apparatus of claim 1, further including a focusing element positioned between the LC display and the light bar to first focus the reflected portions of the IR light onto the row of the IR receivers and to second focus light from the visible light sources into the viewing space through the LC display, whereby the LC display is back lighted.

7. The display apparatus of claim 1, wherein each of the IR receivers is paired with one of the visible light sources and wherein each of the visible light sources comprises a white light emitting diode (LED).

8. The display apparatus of claim 7, wherein the paired ones of the LEDs and the IR receivers are spaced apart less than 1 inch and wherein a receiving surface of the IR receiver and a light emitting surface of the LED are spaced apart an offset distance with the receiving surface more distal to the LC display.

9. The display apparatus of claim 7, wherein the IR light comprises IR modulated at a high frequency and wherein the IR receivers are configured for detecting IR modulated at the high frequency.

10. The display apparatus of claim 1, wherein the illuminator assembly comprises a number of left side IR illuminators and a number of right side IR illuminators, wherein each of the left and ride side IR illuminators each comprises an IR source and a collimator for generating the IR light to the viewing space, and wherein at least one of the left side IR illuminators is directed onto a left side of one of the viewing locations for one of the viewers and at least one of the fight side IR illuminators is directed onto a right side of one of the viewing locations for one of the viewers.

11. The display apparatus of claim 10, wherein the illuminator assembly is operated in time synchronized manner with the display element whereby the left side IR illuminators operate concurrently with the first displaying and the right side IR illuminators operate concurrently with the second displaying.

12. The display apparatus of claim 1, wherein the illuminator assembly comprises a number of left side IR illuminators and a number of right side IR illuminators, wherein each of the left and ride side IR illuminators each comprises an IR source and a collimator for generating the IR light to the viewing space, and wherein each of the IR illuminators is associated with a differing one of the viewers to provide one of the right side IR illuminators and one of the left side IR illuminator for each of the viewers proximate to right and left sides, respectively of the viewer's face.

13. The display apparatus of claim 1, wherein each of the IR receivers is paired with one of the visible light sources and wherein each of the visible light sources comprises a set of colored LEDs spaced apart an offset distance from a plane containing the light bar, whereby chromatic aberration is at least partially corrected in a focusing element positioned between the LC display and the light bar.

14. The display apparatus of claim 1, wherein the visible light is switched between first and second polarizations to display the left eye images during the first displaying and to display the right eye images during the second displaying and wherein the illuminator assembly is operated to be synchronized with the visible light switching to illuminate a left side of each of the viewers with the IR light during the first displaying and to illuminate a ride side of each of the viewers with the IR light during the second displaying.

15. A visual display, comprising:
a light modulator including a front side and a back side for receiving back light;
a plurality of pairs of light emitters and IR receivers, wherein the IR receivers receive IR light emitted from the back side of the light modulator and, in response, the light emitters emit the back light onto the back side of the light modulator only when a paired one of the IR receivers receives the IR light;
a Fresnel lens positioned between the back side of the light modulator and the pairs of the light emitters and the IR receivers, wherein the Fresnel lens defines a light path for the IR light and for the back light through the light modulator to a viewer positioned at a viewing location a distance from the front side of the light modulator; and
an illumination source directing IR light onto the viewer proximate first to a left eye of the viewer and second to a right eye of the viewer, whereby portions of the IR light from the illumination source reflects off of the viewer toward the front side of the light modulator for transmission through the light modulator to the Fresnel lens for directing onto the defined light path for the IR light,
wherein the pairs of the light emitters and the IR receivers are arranged in horizontal and side-by-side rows, and
wherein the viewing space includes a number of tiered rows of individual seats for defining the viewing locations for the viewers and wherein the back light assembly comprises the number of the rows of the IR receivers and the light emitters arranged in tiers.

16. The display of claim 15, further comprising a control mechanism coupled to each of the pairs of the light emitters and the IR receivers, the control mechanism operating to determine when one of the IR receivers is receiving the IR light from the back side of the light modulator and, in response, to trigger a paired one of the light emitters to produce the back light.

17. The display of claim 15, wherein the horizontal rows are parallel and tiered relative to the back side of the light modulator.

18. The display of claim 17, wherein the number of the horizontal rows matches a number of rows of individual seats defining a plurality of the viewing locations.

19. The display of claim 15, further including a synchronization element providing control signals to the illumination source such that the first and second directing of the IR light is performed concurrently with operating of the light modulator to first display left eye images of a stereo media stream and to second display right eye images of the stereo media stream.

20. A method for providing a 3D experience without 3D glasses, comprising:
illuminating left sides of a plurality of viewer faces with IR light;
detecting the IR light reflected from the left sides of the viewer faces;
only during the detecting of the IR light reflected from the left sides of the viewer faces, emitting visible light through a liquid crystal (LC) display operating to display a left eye image;
illuminating right sides of the viewer faces with IR light;
detecting the IR light reflected from the fight sides of the viewer faces; and
only during the detecting of the IR light reflected from the right sides of the viewer faces, emitting visible light through the LC display operating to display a right eye image;
wherein the viewing space includes a number of tiered rows of individual seats for defining viewing locations for the viewers and wherein the back light assembly comprises the number of the rows of IR receivers and visible light emitters arranged in tiers.

21. The method of claim 20, further including directing the IR light reflected from the left and right sides of the viewer paths to follow light paths for performance of the detecting steps and directing the emitted visible light along the light paths to strike the left and right sides of the viewer faces.

22. The method of claim 20, wherein the illuminating of the left sides of the viewer faces is synchronized in time with the operating of the LC display to display the left eye image and wherein the illuminating of the right sides of the viewer faces is synchronized in time with the operating of the LC display to display the right eye image.

* * * * *

UNITED STATES PATENT AND TRADEMARK OFFICE
CERTIFICATE OF CORRECTION

PATENT NO. : 9,041,642 B2  
APPLICATION NO. : 13/717214  
DATED : May 26, 2015  
INVENTOR(S) : Lanny Smoot and Quinn Smithwick It is certified that error appears in the above-identified patent and that said Letters Patent is hereby corrected as shown below:

In the claims,

Column 23, line 63, after the ",", insert therefor --and--.

Column 24, line 51, delete "fight" and insert therefor --right--.

Column 26, line 29, delete "fight" and insert therefor --right--.

Signed and Sealed this  
Ninth Day of February, 2016

Michelle K. Lee  
*Director of the United States Patent and Trademark Office*